US011999210B2

United States Patent
Hwang et al.

(10) Patent No.: US 11,999,210 B2
(45) Date of Patent: Jun. 4, 2024

(54) ELECTROMECHANICAL VEHICLE HEIGHT ADJUSTMENT UNIT AND VEHICLE HEIGHT ADJUSTMENT METHOD

(71) Applicant: ILJIN MOTION & CONTROL GmbH, Frankfurt am Main (DE)

(72) Inventors: Changwon Hwang, Schweinfurt (DE); Sungkeun Lee, Oberursel (DE); Nathan Zambou, Rosbach (DE)

(73) Assignee: ILJIN MOTION & CONTROL GMBH, Frankfurt (DE)

( * ) Notice: Subject to any disclaimer, the term of this patent is extended or adjusted under 35 U.S.C. 154(b) by 206 days.

(21) Appl. No.: 17/670,098

(22) Filed: Feb. 11, 2022

(65) Prior Publication Data

US 2022/0169088 A1  Jun. 2, 2022

Related U.S. Application Data

(63) Continuation of application No. PCT/EP2020/079829, filed on Oct. 22, 2020.

(30) Foreign Application Priority Data

Oct. 25, 2019  (EP) .................................... 19205373
Oct. 25, 2019  (EP) .................................... 19205406
Oct. 25, 2019  (EP) .................................... 19205459

(51) Int. Cl.
*B60G 15/06*  (2006.01)
*B60G 17/005*  (2006.01)
(Continued)

(52) U.S. Cl.
CPC ....... *B60G 17/0157* (2013.01); *B60G 15/063* (2013.01); *B60G 15/067* (2013.01);
(Continued)

(58) Field of Classification Search
CPC .. B60G 15/063; B60G 15/067; B60G 17/005; B60G 17/021; B60G 17/0157;
(Continued)

(56) References Cited

U.S. PATENT DOCUMENTS 5,060,959 A  10/1991  Davis et al.
5,193,408 A   3/1993  Fukui et al.
(Continued)

FOREIGN PATENT DOCUMENTS

CN  112955336 B  *  6/2022  ........... B60G 17/005
DE    3743944 A1      7/1989
(Continued)

OTHER PUBLICATIONS

Baemul "The Chassis of the Future," 10 pages, 2014.

*Primary Examiner* — Jason D Shanske
*Assistant Examiner* — Daniel M. Keck
(74) *Attorney, Agent, or Firm* — Seager, Tufte & Wickhem, LLP

(57) ABSTRACT

An electromechanical vehicle height adjustment unit comprises an upper spring pad operative to support an upper end of a vehicle spring, a top mount that is displaceable relative to the upper spring pad, and a displacement mechanism coupled to the upper spring pad and the top mount and operative to displace the top mount relative to the upper spring pad in a height direction. The displacement mechanism comprises a rotary-to-linear motion conversion mechanism and an electric motor.

20 Claims, 14 Drawing Sheets

(51) Int. Cl.
   *B60G 17/015* (2006.01)
   *B60G 17/02* (2006.01)
(52) U.S. Cl.
   CPC ......... *B60G 17/005* (2013.01); *B60G 17/021* (2013.01); *B60G 2202/42* (2013.01); *B60G 2202/422* (2013.01); *B60G 2204/10* (2013.01); *B60G 2204/1242* (2013.01); *B60G 2204/128* (2013.01); *B60G 2204/419* (2013.01); *B60G 2400/10* (2013.01); *B60G 2400/102* (2013.01); *B60G 2400/202* (2013.01); *B60G 2400/252* (2013.01); *B60G 2500/30* (2013.01); *B60G 2600/04* (2013.01); *B60G 2600/08* (2013.01); *B60G 2800/914* (2013.01)
(58) Field of Classification Search
   CPC .......... B60G 2202/42; B60G 2202/422; B60G 2204/10; B60G 2204/124; B60G 2204/1242; B60G 2204/128; B60G 2204/419; B60G 2300/30; B60G 2300/60; B60G 2400/10; B60G 2400/102; B60G 2400/202; B60G 2400/252; B60G 2500/30; B60G 2600/04; B60G 2600/08; B60G 2800/914
   See application file for complete search history.

(56) References Cited

U.S. PATENT DOCUMENTS

| | | | |
|---|---|---|---|
| 5,401,053 | A | 3/1995 | Sahm et al. |
| 5,810,335 | A | 9/1998 | Wirtz et al. |
| 6,170,621 | B1 | 1/2001 | Nakahara et al. |
| 6,857,625 | B2 | 2/2005 | Löser et al. |
| 6,902,045 | B2 | 6/2005 | Oliver et al. |
| 7,135,794 | B2 | 11/2006 | Kühnel |
| 7,611,152 | B2 | 11/2009 | van der Knaap |
| 7,644,935 | B2 | 1/2010 | Münster et al. |
| 7,722,056 | B2 | 5/2010 | Inoue et al. |
| 8,087,676 | B2 | 1/2012 | McIntyre |
| 8,191,874 | B2 | 6/2012 | Inoue et al. |
| 8,262,100 | B2 | 9/2012 | Thomas |
| 8,285,448 | B2 | 10/2012 | Inoue et al. |
| 8,370,022 | B2 | 2/2013 | Inoue et al. |
| 8,371,588 | B2 | 2/2013 | Kohlhauser et al. |
| 8,408,561 | B2 | 4/2013 | Mochizuki |
| 8,469,370 | B2 | 6/2013 | Kondo et al. |
| 8,516,914 | B2 | 8/2013 | Osterlänger et al. |
| 8,544,620 | B2 | 10/2013 | Inoue et al. |
| 8,641,052 | B2 | 2/2014 | Kondo et al. |
| 8,833,775 | B2 | 9/2014 | Kim et al. |
| 8,844,943 | B2 | 9/2014 | Kim et al. |
| 8,943,916 | B2 | 2/2015 | Osterlaenger et al. |
| 9,108,484 | B2 | 8/2015 | Reybrouck |
| 9,452,652 | B2 | 9/2016 | Kim |
| 9,694,643 | B2 | 7/2017 | Mersmann et al. |
| 9,707,819 | B2 | 7/2017 | Dobre et al. |
| 10,166,831 | B2 | 1/2019 | Krehmer |
| 10,259,283 | B2 | 4/2019 | Lee et al. |
| 10,328,763 | B2 | 6/2019 | Lee et al. |
| 10,690,215 | B2 | 6/2020 | Sakka et al. |
| 10,703,163 | B2 | 7/2020 | Lee et al. |
| 10,807,432 | B2 | 10/2020 | Lee et al. |
| 2002/0089107 | A1 | 7/2002 | Koh |
| 2004/0232648 | A1 | 11/2004 | Ohki |
| 2007/0210539 | A1 | 9/2007 | Hakui et al. |
| 2009/0108546 | A1 | 4/2009 | Ohletz et al. |
| 2009/0121398 | A1* | 5/2009 | Inoue ............. B60G 17/0157 267/140.14 |
| 2009/0230640 | A1* | 9/2009 | Michel ............ B60G 17/0157 280/6.157 |
| 2017/0197484 | A1 | 7/2017 | Mersmann et al. |
| 2020/0198432 | A1 | 6/2020 | Tate |
| 2020/0384822 | A1 | 12/2020 | Bruno et al. |
| 2021/0291609 | A1* | 9/2021 | Goto ................. B60G 17/016 |

FOREIGN PATENT DOCUMENTS

| | | |
|---|---|---|
| DE | 4416280 C1 | 5/1995 |
| DE | 19510032 C2 | 10/1999 |
| DE | 19935931 A1 | 2/2000 |
| DE | 20105329 U1 | 6/2001 |
| DE | 10101694 C5 | 5/2002 |
| DE | 10144111 A1 | 3/2003 |
| DE | 102004030304 A1 | 9/2005 |
| DE | 19648050 B4 | 3/2006 |
| DE | 102005001737 A1 | 7/2006 |
| DE | 102005001744 B3 | 7/2006 |
| DE | 102006001575 A1 | 8/2006 |
| DE | 102006056762 A1 | 6/2008 |
| DE | 102007012203 A1 | 9/2008 |
| DE | 102007025468 A1 | 12/2008 |
| DE | 102007026606 A1 | 12/2008 |
| DE | 102007040734 B4 | 5/2009 |
| DE | 102007060422 A1 | 6/2009 |
| DE | 102007011615 B4 | 7/2009 |
| DE | 102008004887 A1 | 7/2009 |
| DE | 102008013913 A1 | 9/2009 |
| DE | 102008023891 A1 | 11/2009 |
| DE | 10122542 B4 | 12/2009 |
| DE | 102007004747 B4 | 2/2010 |
| DE | 102008053617 A1 | 5/2010 |
| DE | 102007051299 B4 | 7/2010 |
| DE | 102007051971 B4 | 9/2010 |
| DE | 102009014201 A1 | 9/2010 |
| DE | 102009016252 A1 | 10/2010 |
| DE | 102007059140 B4 | 11/2010 |
| DE | 19955410 B4 | 5/2011 |
| DE | 102009053124 A1 | 5/2011 |
| DE | 102010036238 A1 | 3/2012 |
| DE | 102010053334 A1 | 6/2012 |
| DE | 102008060477 B4 | 7/2012 |
| DE | 10306157 B4 | 3/2014 |
| DE | 102008033820 B4 | 6/2015 |
| DE | 103445987 B4 | 1/2016 |
| DE | 102006010052 B4 | 7/2016 |
| DE | 102008050679 B4 | 1/2017 |
| DE | 102015119637 A1 | 5/2017 |
| DE | 102015119638 A1 | 5/2017 |
| DE | 102015224527 A1 | 6/2017 |
| DE | 102017109145 B3 | 5/2018 |
| DE | 102009058026 B4 | 6/2019 |
| DE | 102013211660 B4 | 9/2020 |
| EP | 1449687 A2 | 8/2004 |
| EP | 1681186 A1 | 7/2006 |
| EP | 1681189 A2 | 7/2006 |
| EP | 1688280 B1 | 11/2007 |
| EP | 1927486 A2 | 6/2008 |
| EP | 1953013 A2 | 8/2008 |
| EP | 1970226 A2 | 9/2008 |
| EP | 1997655 A1 | 12/2008 |
| EP | 2119579 A2 | 11/2009 |
| EP | 2145781 A1 | 1/2010 |
| EP | 1867503 B1 | 9/2010 |
| EP | 2236324 A2 | 10/2010 |
| EP | 2332756 A2 | 6/2011 |
| EP | 1927486 B1 | 1/2012 |
| EP | 2199121 B1 | 1/2012 |
| EP | 2408632 B1 | 5/2014 |
| EP | 2342094 B1 | 11/2015 |
| EP | 2421718 B1 | 10/2016 |
| EP | 3033238 B1 | 7/2017 |
| EP | 3046783 B1 | 4/2019 |
| EP | 3386781 B1 | 3/2020 |
| JP | H07253135 A | 10/1995 |
| JP | H07253136 A | 10/1995 |
| JP | H11254934 A | 9/1999 |
| JP | 2000055107 A | 2/2000 |
| JP | 2000055105 A | 2/2000 |
| JP | 2000055106 A | 2/2000 |
| JP | 2000055108 A | 2/2000 |
| JP | 2000062427 A | 2/2000 |
| JP | 2000205326 A | 7/2000 |
| JP | 2000247126 A * | 9/2000 | ........... B60G 15/063 |
| JP | 2001080336 A | 3/2001 |

(56) References Cited

FOREIGN PATENT DOCUMENTS

| | | |
|---|---|---|
| JP | 2001105821 A | 4/2001 |
| JP | 2001171322 A | 6/2001 |
| JP | 2001328411 A | 11/2001 |
| JP | 2002036841 A | 2/2002 |
| JP | 2002219920 A | 8/2002 |
| JP | 2003320831 A | 11/2003 |
| JP | 3489164 B2 | 1/2004 |
| JP | 2004338490 A | 12/2004 |
| JP | 2006063580 A | 3/2006 |
| JP | 3882782 B2 | 2/2007 |
| JP | 2008100539 A | 5/2008 |
| JP | 4127298 B2 | 7/2008 |
| JP | 2008222219 A | 9/2008 |
| JP | 2008294367 A | 12/2008 |
| JP | 2008308026 A | 12/2008 |
| JP | 4468911 B2 | 5/2010 |
| JP | H4500471 B2 | 7/2010 |
| JP | 4519113 B2 | 8/2010 |
| JP | 4525918 B2 | 8/2010 |
| JP | 4590028 B2 | 12/2010 |
| JP | 4708237 B2 | 6/2011 |
| JP | 4743276 B2 | 8/2011 |
| JP | 5105965 B2 | 12/2012 |
| JP | 5230230 B2 | 7/2013 |
| JP | 5261316 B2 | 8/2013 |
| JP | 5275014 B2 | 8/2013 |
| JP | 5424751 B2 | 2/2014 |
| KR | 100192380 B1 | 6/1999 |
| KR | 100865644 B1 | 10/2008 |
| KR | 101393768 B1 | 5/2014 |
| KR | 101393841 B1 | 5/2014 |
| KR | 101393931 B1 | 5/2014 |
| KR | 101491359 B1 | 2/2015 |
| KR | 20150094336 A | 8/2015 |
| KR | 20160143766 A | 12/2016 |
| KR | 20180069555 A | 6/2018 |
| KR | 20180069556 A | 6/2018 |
| KR | 20180082701 A | 7/2018 |
| KR | 10189071 B1 | 9/2018 |
| KR | 1020190104814 A | 9/2019 |
| KR | 20190119478 A | 10/2019 |
| KR | 20200025243 A | 3/2020 |
| KR | 20200142207 A | 12/2020 |
| WO | 2009071149 A1 | 7/2009 |
| WO | 2010058773 A1 | 5/2010 |
| WO | 2011080163 A1 | 7/2011 |
| WO | 2011141155 A1 | 11/2011 |
| WO | 2015154763 A1 | 10/2015 |
| WO | 2018196911 A1 | 11/2018 |
| WO | 2015040078 A1 | 4/2019 |

\* cited by examiner

ELECTROMECHANICAL VEHICLE HEIGHT ADJUSTMENT UNIT AND VEHICLE HEIGHT ADJUSTMENT METHOD

PRIORITY DATA

This application is a continuation of International Application No. PCT/EP2020/079829, filed Oct. 22, 2020, which claims priority to EP Application No. 19205459.1, filed Oct. 25, 2019; EP Application No. 19205406.2, filed Oct. 25, 2019; and EP Application No. 19205373.4, filed Oct. 25, 2019, the contents of which are herein incorporated by reference in their entirety.

TECHNICAL FIELD

The invention relates to devices, systems, and methods for vehicle height adjustment. The invention relates in particular to techniques for electromechanical vehicle height adjustment.

BACKGROUND

Vehicle height adjustment may be desirable for enhanced comfort of drivers or passengers of a vehicle. Vehicle height adjustment may also be desirable for increased safety. For illustration, by adjusting the height of a vehicle body relative to the plane on which the wheels are arranged, the risk of damage to the vehicle may be mitigated when the height of the vehicle body is adjusted based on the situation, e.g., based on the terrain, on which the vehicle is located.

Many devices, systems, and methods for vehicle height adjustment use pneumatic or hydraulic techniques for performing a height adjustment. The compressors of such pneumatic or hydraulic height adjustment systems require significant installation space, which is undesirable. The compressors of pneumatic or hydraulic height adjustment systems may create noise levels during operation, which may be perceived as being disturbing by the driver or passenger of a vehicle. Pneumatic or hydraulic height adjustment systems are also prone to damage to which fluid lines, control valves, or other pneumatic or hydraulic components may be subjected during operation.

In view of the drawbacks that may be associated with pneumatic or hydraulic height adjustment systems, electromechanical height adjustment systems are considered attractive by many vehicle manufacturers. Exemplary electromechanical systems for height adjustment are described in, e.g., DE 101 44 111 A1, U.S. Pat. No. 5,060,959 A, WO 2018/196911 A1, DE 10 2009 058 026 B4, DE 199 55 410 A1, and US 2017/0197484 A1.

These electromechanical height adjustment systems mitigate some of the shortcomings of pneumatic or hydraulic height adjustment systems. However, conventional electromechanical height adjustment systems may still be associated with various shortcomings. For illustration, the installation space required for installing some conventional electromechanical height adjustment systems may be undesirably large. Some conventional electromechanical height adjustment systems require car manufacturers to make adaptations to the vehicle construction, e.g., to the suspension system and/or control arms, in order to accommodate the electromechanical height adjustment system. Some conventional electromechanical height adjustment systems can support only a comparatively low number of different height levels. For illustration, the system of US 2017/0197484 A1 is designed so as to provide three predefined height levels, which may be considered too limiting for many applications.

SUMMARY

There is a need for improved devices, systems, and methods for vehicle height adjustment. There is in particular a need for devices, systems, and methods for vehicle height adjustment that have compact installation space requirements, can be easily installed, and require little or no modifications to the vehicle layout. There is in particular a need for such devices, systems, and methods for vehicle height adjustment that provide enhanced flexibility by being not limited to just one, two or three height levels, and/or that provide enhanced safety also in case of component failure. There is in particular a need for such devices, systems, and methods for vehicle height adjustment that are adapted for performing front axle height adjustment.

According to the invention, an electromechanical vehicle height adjustment unit and a method as recited in the independent claims are provided. The dependent claims define embodiments.

According to exemplary embodiments of the invention, an electromechanical vehicle height adjustment unit is provided that has a displacement mechanism operative to displace a top mount relative to an upper spring pad that supports an upper end of a vehicle spring. The vehicle spring may extend into the displacement mechanism and/or at least part of the displacement mechanism may be arranged to surround a damper. Installation space requirements and/or installation costs may be reduced. Problems associated with hydraulic or pneumatic height adjustment may be eliminated.

The electromechanical vehicle height adjustment unit may comprise an upper spring pad operative to support an upper end of a vehicle spring, a top mount that is displaceable relative to the upper spring pad, and a displacement mechanism coupled to the upper spring pad and the top mount and operative to displace the top mount relative to the upper spring pad in a height direction. The displacement mechanism may comprise a rotary-to-linear motion conversion mechanism, comprising a first member that is rotatably mounted and a second member and an electric motor coupled to the rotary-to-linear motion conversion mechanism to drive the first member.

Preferably, a clearance (e.g. an annular gap) is provided between the damper and the second member and/or the upper spring pad. In particular, a clearance (e.g., an annular gap) may be provided between a portion of the damper extending through the second member and/or the upper spring pad (such as a damper rod) and the second member or upper spring pad, respectively.

Preferably, a clearance is also provided between the first member and the damper, in particular between the first member and the damper rod. In this manner, the damper and/or damper rod may be given sufficient space for rotating around a rotation point, e.g. by a cardinal angle. This rotation point may also be referred to as a "hard point" in the context of the present invention. The hard point or the rotation point may be at the connection between the damper rod and the top mount, in particular at a connection between the damper rod upper side and the top mount.

A clearance (e.g., an annular gap) may also be provided between the damper and the top mount. In particular, a clearance (e.g., an annular gap) may be provided between a portion of the damper extending through the top mount (such as the damper rod) and the top mount.

Preferably, a clearance is also provided between the first member and the outer diameter of the vehicle spring. In embodiments of the present invention, the second member and the upper spring pad are closer to the top mount and a large section of the spring (e.g., at least 20%, at least 30% or at least 50% of the total length of the spring at a respective levelling position) is received inside the first member during leveling (in particular at a vehicle lowest position). Sufficient clearance in order to enable all driven maneuvers (e.g., jounce and rebound at full left/right turning) at this position should thus be provided.

The second member of the rotary-to-linear motion conversion mechanism may be attached to or integrally formed with the upper spring pad.

The second member of the rotary-to-linear motion conversion mechanism may be fixed relative to the upper spring pad so that it is not rotatable relative to the upper spring pad and that it is not displaceable in a translatory manner relative to the upper spring pad. The first member of the rotary-to-linear motion conversion mechanism may be mounted so as to be rotatable relative to the second member and displaceable along a center axis of the second member.

In another embodiment, the first member may be rotatably mounted and the second member may be secured against rotation, but may be displaceable in a translatory manner along a center axis of the second member.

The first member may have a first outer length $M'_{oP,oL}$ parallel to a center axis of the first member and a first inner length $M'_{oP,iL}$ parallel to the center axis of the first member. The second member may have a second outer length $M'_{iP,oL}$ parallel to a center axis of the second member and a second inner length $M'_{iP,iL}$ parallel to the center axis of the second member. The first outer length $M'_{oP,oL}$ may be at least 2.3 times the second outer length $M'_{iP,iL}$ and/or first inner length $M'_{oP,iL}$ may be at least 2.1 times the second inner length $M'_{iP,iL}$.

The electromechanical vehicle height adjustment unit provides compact installation space, which facilitates installation without requiring vehicle manufacturers to make adaptations to accommodate the electromechanical vehicle height adjustment unit. The electromechanical vehicle height adjustment unit is also suitable to set the top mount to four or more than four different height levels, e.g., to any height level in a continuous range of height levels, by driving the rotary-to-linear motion conversion mechanism.

The electromechanical vehicle height adjustment unit may be formed as an integral unit.

The electromechanical vehicle height adjustment unit may further comprise the vehicle spring. The second member of the rotary-to-linear motion conversion mechanism may have an inner diameter $M'_{iP,iD}$ which is greater than or equal to an outer diameter $VS'_{uoD}$ of an upper end of the vehicle spring.

The first member and/or the second member of the rotary-to-linear motion conversion mechanism may define an interior volume configured to receive at least a portion of the vehicle spring therein.

The first member and/or the second member may extend around a vehicle damper.

The upper spring pad may be arranged in a cavity of the first member and/or a cavity of the second member of the rotary-to-linear motion conversion mechanism.

The top mount may be operative for attachment, e.g. for rigid attachment, to a vehicle body.

The electromechanical vehicle height adjustment unit may further comprise a lower spring pad operative to support a lower end of the vehicle spring.

The lower spring pad may be connected to a damper at a fixed position along a longitudinal axis of the damper.

The displacement mechanism may be operative to position the top mount at four different height positions or more than four different height positions relative to the upper spring pad.

The displacement mechanism may be operative to position the top mount at any height position of a continuous range of height positions relative to the upper spring pad.

The displacement mechanism may be operative to output electric energy for storing in a rechargeable energy storage device in response to a vehicle lowering operation.

The electric motor may be a direct current (DC) motor.

The displacement mechanism may be operative such that displacement of the top mount during the vehicle lowering operation effects a rotation of a rotor of the electric motor to output the electric energy via terminals of the electric motor. A separate generator could be employed instead of the electric motor to generate the electric energy.

The electromechanical vehicle height adjustment unit may further comprise the rechargeable energy storage device.

The rechargeable energy storage device may be an extension of a primary power unit, such as a traction battery or other vehicle battery, of the vehicle. The rechargeable energy storage device may enable the displacement mechanism to be connected to a 12V vehicle battery or a 48V vehicle battery, as used in hybrid or electric vehicles.

The electromechanical vehicle height adjustment unit may further comprise circuitry operative to effect charging of the rechargeable energy storage device with the electric energy output by the displacement mechanism.

The circuitry may be operative to effect partial or full discharging of the rechargeable energy storage device to the electric motor to perform a vehicle raising operation.

The circuitry may include conductors, logic circuits operative to determine whether charging or discharging is to be performed, and optional converters. The logic circuits may include integrated semiconductor circuits, such as processors, controllers, or application specific integrated circuits (ASICs). The converters may include DC/DC or AC/DC converters.

The electromechanical vehicle height adjustment unit may further comprise a locking system. The locking system may provide enhanced safety, e.g. in case of component failure.

The locking system may be displaceable between a first configuration in which the locking system permits displacement of the top mount relative to the upper spring pad and a second configuration in which the locking system prevents displacement of the top mount relative to the upper spring pad.

The locking system may be coaxial with, and/or operative to engage with, a rotor of the electric motor, a shaft of the electric motor, the first member of the rotary-to-linear motion conversion mechanism, or a transmission.

The locking system may be operative to maintain the second configuration without requiring an electric power supply.

The locking system may be operative to maintain the second configuration when the top mount is positioned at any one of four or more than four different height positions relative to the upper spring pad.

The locking system may be configured to maintain the second configuration when the top mount is positioned at any height position of a continuous range of height positions relative to the upper spring pad.

The electromechanical vehicle height adjustment unit may further comprise a control unit operative to activate the locking system to place the locking system into the second configuration.

The control unit may be provided locally at the vehicle spring or the top mount, e.g., rigidly attached to the top mount.

The control unit may comprise one or several integrated semiconductor circuits. The control unit may comprise one or several processors, controllers, ASICs, or combinations thereof.

The control unit may be operative to, in response to detection of a malfunction of the locking system, cause a warning signal to be output to a driver of the vehicle and cause activation of the electric motor to displace the top mount relative to the upper spring pad to a defined safe state position.

The electromechanical vehicle height adjustment unit may further comprise a transmission coupled between the electric motor and the first member of the rotary-to-linear motion conversion mechanism.

The transmission may comprise a belt drive, a gear or a gear train.

The displacement mechanism may be operative to displace the top mount relative to the upper spring pad in response to a height signal from a height sensor and/or to adjust a displacement speed in response to an acceleration signal from an acceleration sensor.

The displacement mechanism may be operative to displace the top mount by at least 60 mm relative to the upper spring pad.

The displacement mechanism may be operative to displace the top mount between a lowest position and a highest position relative to the upper spring pad, wherein a distance between the lowest position and the highest position defines a stroke length $S'_L$ of the displacement mechanism, and wherein a ratio between a maximum outer diameter $M'_{oP,oD}$ of the first member of the rotary-to-linear motion conversion mechanism and the stroke length $S'_L$ is at least 2.

The first member of the rotary-to-linear motion conversion mechanism may be a screw nut, in particular a ball screw nut, having an internal thread and the second member of the rotary-to-linear motion conversion mechanism may be a screw shaft, in particular a ball screw shaft, having an external thread.

A ball center diameter $M'_{BCD}$ measured between center lines of balls on opposing sides of the ball screw nut may be at least 10 times a diameter of each of the balls, preferably at least 12 times a diameter of each of the balls, preferably at least 15 times a diameter of each of the balls.

The first member of the rotary-to-linear motion conversion mechanism may be a screw nut having an internal thread and the second member of the rotary-to-linear motion conversion mechanism is a lead screw shaft having an external thread.

The first and second members of the rotary-to-linear motion conversion mechanism may be threadingly engaged with each other.

The first member of the rotary-to-linear motion conversion mechanism may have a first outer diameter $M'_{oP,oD}$ and the second member of the rotary-to-linear motion conversion mechanism may have a second inner diameter $M'_{iP,iD}$. The first outer diameter $M'_{oP,oD}$ may be greater than 1.2 times the second inner diameter $M'_{iP,iD}$.

The second member of the rotary-to-linear motion conversion mechanism may be a hollow shaft.

A shaft of the electric motor may be arranged such that it is not coaxial with the first member of the rotary-to-linear motion conversion mechanism. It may nevertheless be parallel.

The electromechanical vehicle height adjustment unit may be a front axle height adjustment unit.

A vehicle height adjustment system according to an embodiment comprises at least two vehicle height adjustment units of any one of the preceding aspects or embodiments, and at least one integrated semiconductor circuit operative to control the electric motors of the at least two vehicle height adjustment units.

The at least one integrated circuit may be operative to control the electric motors in response to an acceleration signal indicating a vertical acceleration, a height sensor signal, and/or a signal indicating an operating state of the vehicle (e.g., road usage or off-road usage).

The at least one integrated circuit may be operative to execute a closed-loop control routine.

The at least one integrated circuit may be operative to execute an open-loop control routine.

The at least two vehicle height adjustment units may be front axle height adjustment units.

The vehicle height adjustment system may comprise at least two further vehicle height adjustment units, which may be rear axle height adjustment units.

The at least two further vehicle height adjustment units may have a construction that is different from that of the two vehicle height adjustment units that provide front axle height adjustment.

The at least two further vehicle height adjustment units may respectively include a lower control arm and may be operative to displace a lower spring pad relative to the lower control arm.

The at least two further vehicle height adjustment units may respectively comprise a displacement mechanism having an electric motor and a rotary-to-linear motion conversion mechanism, with at least a part of the displacement mechanism being arranged within a cavity of the lower control arm.

A vehicle according to an embodiment comprises the vehicle height adjustment system according to an embodiment.

The vehicle may be a hybrid vehicle or an electric vehicle.

The vehicle may be a car, bus, or lorry.

A method of performing a vehicle height adjustment operation according to an embodiment uses an electromechanical vehicle height adjustment unit. The electromechanical vehicle height adjustment unit comprises an upper spring pad operative to support an upper end of a vehicle spring, a top mount that is displaceable relative to the upper spring pad, and a displacement mechanism coupled and/or rigidly attached to the upper spring pad and the top mount and operative to displace the top mount relative to the upper spring pad in a height direction. The displacement mechanism may comprise an electric motor and a rotary-to-linear motion conversion mechanism. The rotary-to-linear motion conversion mechanism comprises a first member that is rotatably mounted and a second member. The method comprises powering the electric motor to drive the first member of the rotary-to-linear motion conversion mechanism to displace the top mount relative to the upper spring pad.

The method may further comprise activating, by a control unit, a locking system to place the locking system into a configuration in which the locking system allows displacement of the top mount relative to the upper spring pad.

The method may comprise, in response to detection of a malfunction of the locking system, causing, by the control unit, a warning signal to be output to a driver of the vehicle, and causing, by the control unit, activation of the electric motor to displace the top mount relative to the upper spring pad to a defined safe state position.

The method may be used to position the top mount relative to the upper spring pad at four different height positions or more than four different height positions. The versatility of the vehicle height adjustment may be enhanced thereby.

The method may be used to position the top mount relative to the upper spring pad at any height position of a continuous range of height positions. The versatility of the vehicle height adjustment may be enhanced thereby.

The method may comprise outputting, by the displacement mechanism, electric energy for storing in a rechargeable energy storage device in response to a vehicle lowering operation. Energy efficiency may be enhanced.

The electric motor may be a direct current (DC) motor which generates and outputs the electric energy in a vehicle lowering operation.

The method may comprise storing, by the rechargeable energy storage device, the electric energy output by the displacement mechanism. The rechargeable energy storage device may act as a local energy storage system that is provided separately from and in addition to a vehicle battery. The rechargeable energy storage device may comprise one or several capacitors or rechargeable batteries.

The method may comprise activating, by a control unit, a locking system that is displaceable between a first configuration in which the locking system permits displacement of the top mount relative to the upper spring pad and a second configuration in which the locking system prevents displacement of the top mount relative to the upper spring pad.

The locking system may be coaxial with, and/or operative to engage with, a rotor of the electric motor, the first member of the rotary-to-linear motion conversion mechanism, or a transmission.

The method may comprise maintaining, by the locking system, the second configuration without requiring an electric power supply.

The method may comprise controlling, by the control unit, the electric motor and the locking system in response to a height signal from a height sensor and/or adjusting, by the control unit, a displacement speed in response to an acceleration signal from an acceleration sensor.

The acceleration signal may be indicative of a vertical acceleration of the vehicle.

The method may comprise controlling, by the control unit, the electric motor and/or the locking system in response to a vehicle drive setting, which may be provided by a user input or set automatically in response to a sensor signal. The vehicle drive setting may be indicative of, e.g., a terrain on which the vehicle is being used, such as road or off-road use, and/or passengers entering or exiting the vehicle.

The method may be performed using the electromechanical vehicle height adjustment unit according to any one of the embodiments disclosed herein.

The method may comprise controlling, by the control unit, at least two electromechanical vehicle height adjustment units according to any one of the embodiments disclosed herein, which may be front axle height adjustment units.

The method may comprise controlling, by the control unit, at least two further electromechanical vehicle height adjustment units, which may be rear axle height adjustment units and which may have a construction that is different from the construction of the front axle height adjustment units.

The method may be used to perform closed-loop control of a vehicle height.

The method may be used to perform open-loop control of a vehicle height.

The method may be performed to control a vehicle height of an electric or hybrid vehicle.

The method may be performed to control a vehicle height of a car, bus, or lorry.

The method may be performed using the electromechanical vehicle height adjustment unit according to an embodiment.

Additional optional features and effects that may be implemented in the method according to embodiments correspond to the features and associated effects described with reference to the electromechanical vehicle height adjustment unit, the height adjustment system, and the vehicle according to embodiments.

Various effects and advantages are attained by the devices, systems, and methods according to embodiments. For illustration, the devices, systems, and methods according to embodiments provide height adjustment while requiring only a compact installation space, facilitate installation in vehicles, and require little or no modifications to the vehicle layout. The devices, systems, and methods for vehicle height adjustment provide enhanced flexibility. For illustration, a top mount may be positioned relative to an upper spring pad at four or more than four height levels. The locking system and its control logic provide enhanced safety in case of component failure, e.g., in case of motor failure.

The electromechanical vehicle height adjustment unit is adapted for performing front axle height adjustment, without being limited thereto.

BRIEF DESCRIPTION OF THE DRAWINGS

Embodiments of the invention will be described with reference to the drawings, in which identical or similar reference signs designate identical or similar components.

DETAILED DESCRIPTION OF EMBODIMENTS

Embodiments of the invention will be described in detail with reference to the drawings. While some embodiments will be described in the context of specific vehicles, such as electric or hybrid vehicles, embodiments are not limited thereto. While some embodiments will be described in the context of front axle height adjustment, the vehicle height adjustment unit according to embodiments is not limited thereto.

Features of embodiments may be combined with each other, unless specifically stated otherwise.

Electromechanical Vehicle Height Adjustment Unit

Figure 1:
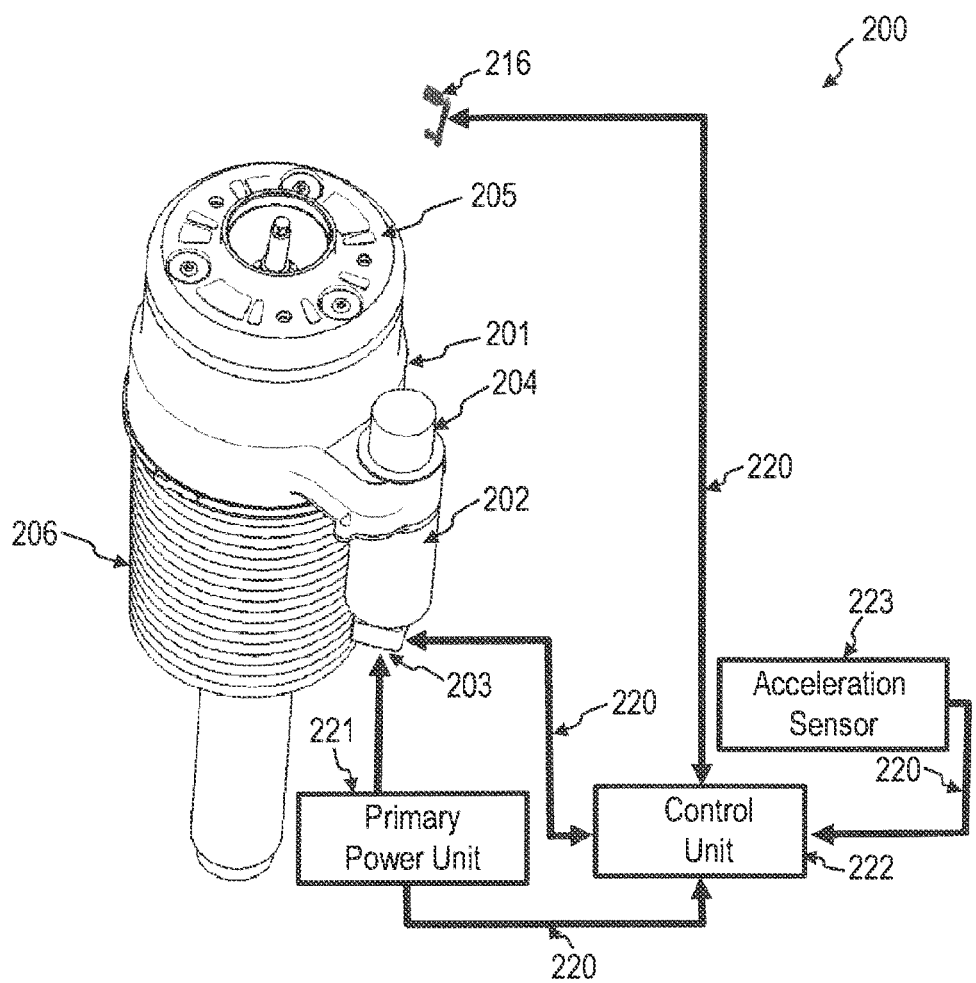
FIG. 1 is a schematic perspective view of a vehicle height adjustment unit according to an embodiment.
Figure 2:
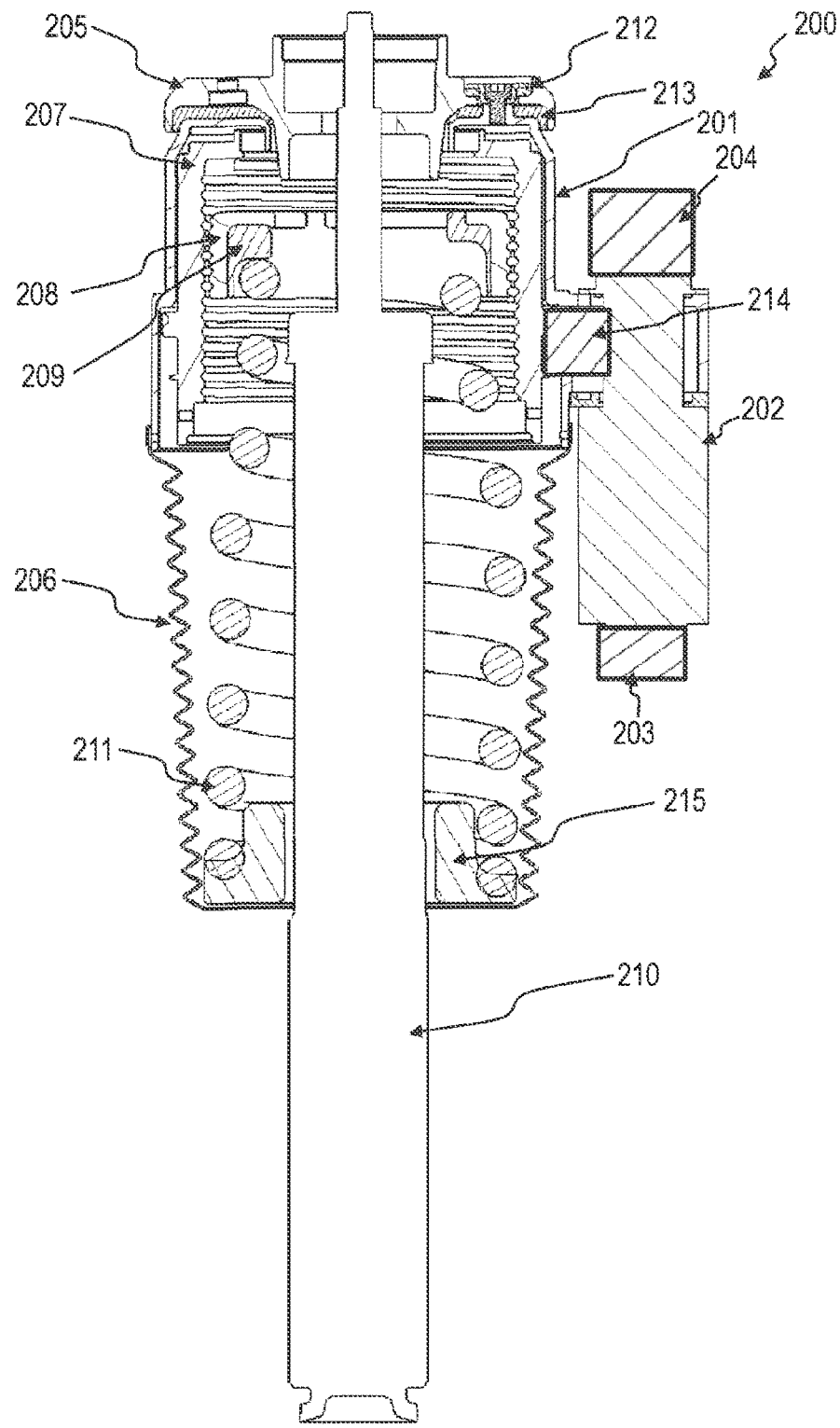
FIG. 2 is a cross-sectional view of the vehicle height adjustment unit of FIG. 1.
Figure 3:
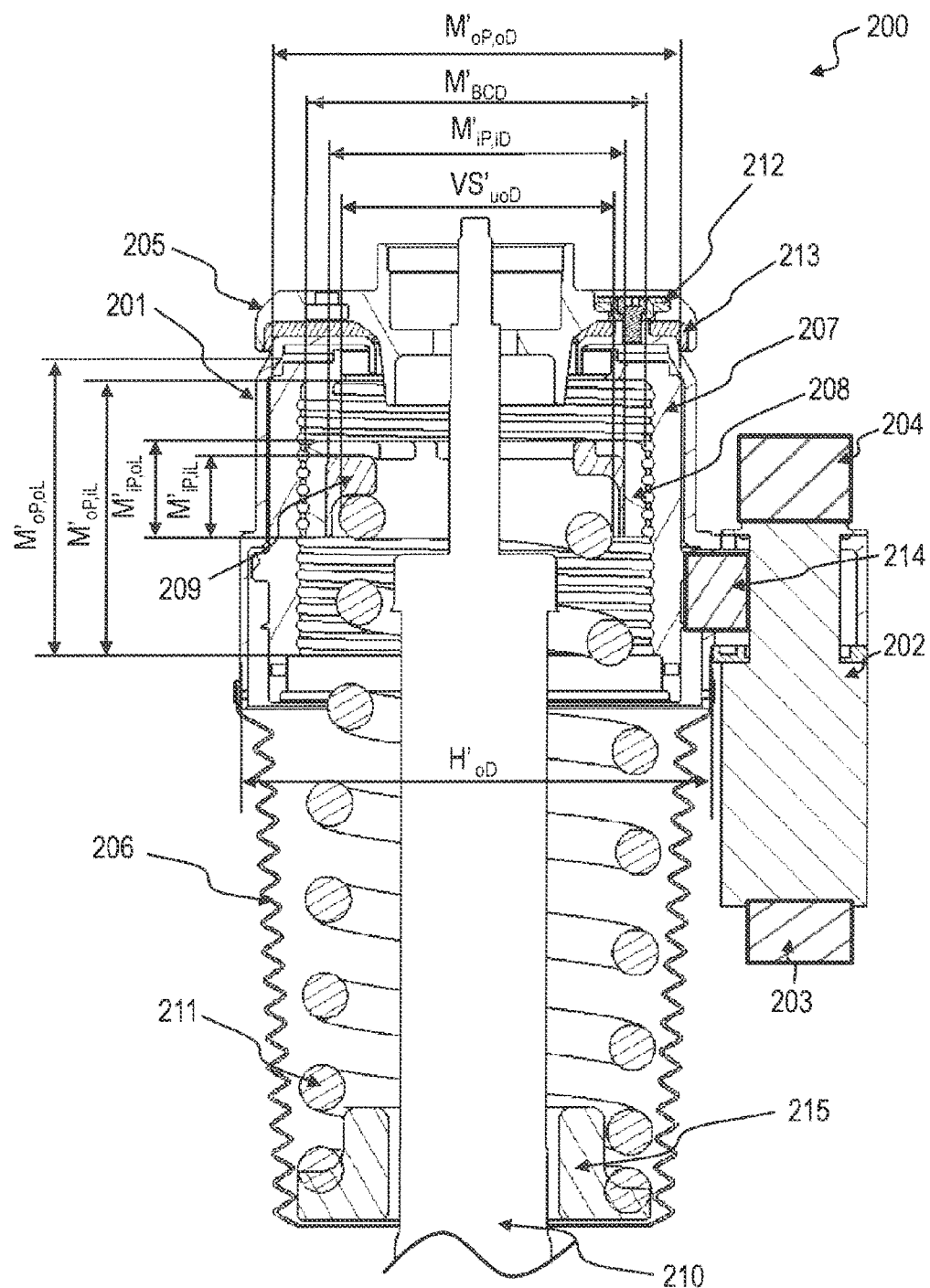
FIG. 3 is a cross-sectional view of the vehicle height adjustment unit of FIG. 1.
Figure 4:
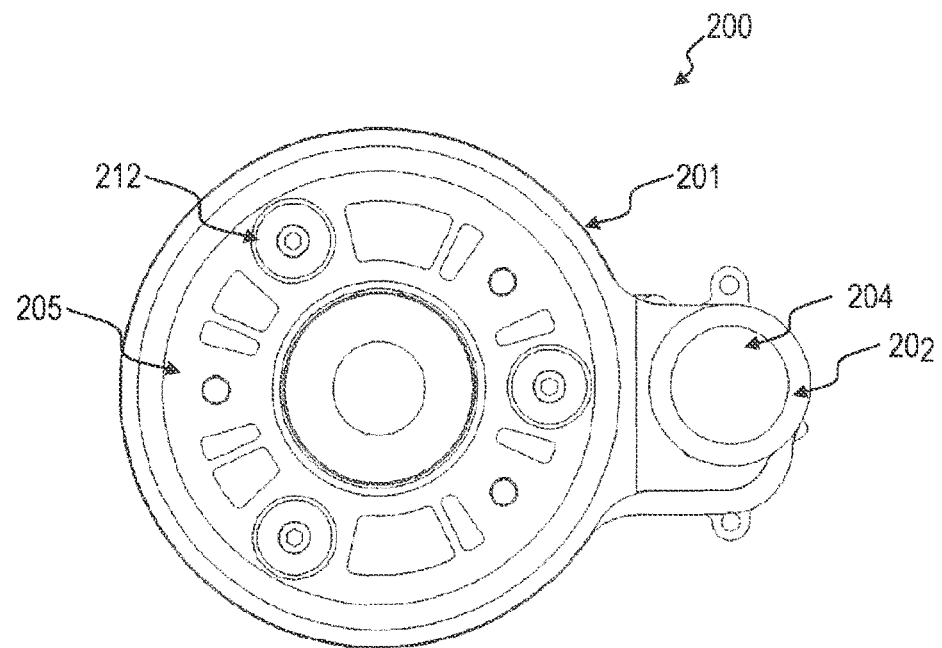
FIG. 4 is a plan view of the vehicle height adjustment unit of FIG. 1.
Figure 5:
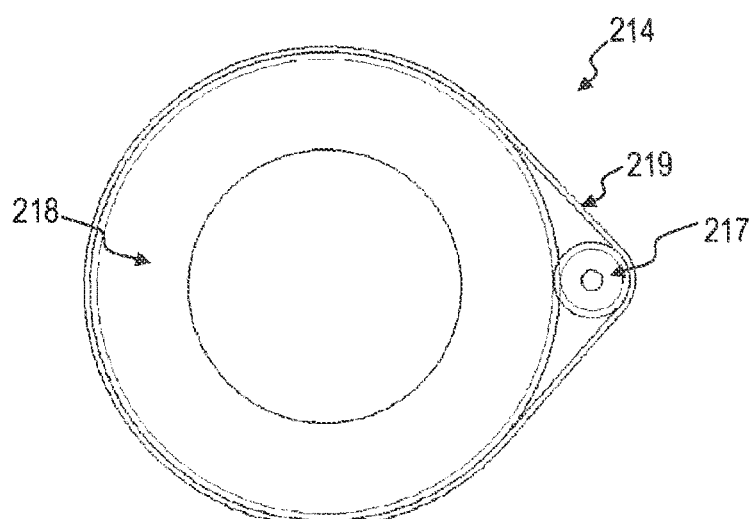
FIG. 5 is a plan view of a transmission that may be used in the vehicle height adjustment unit of FIGS. 1 to 4.
Figure 6:
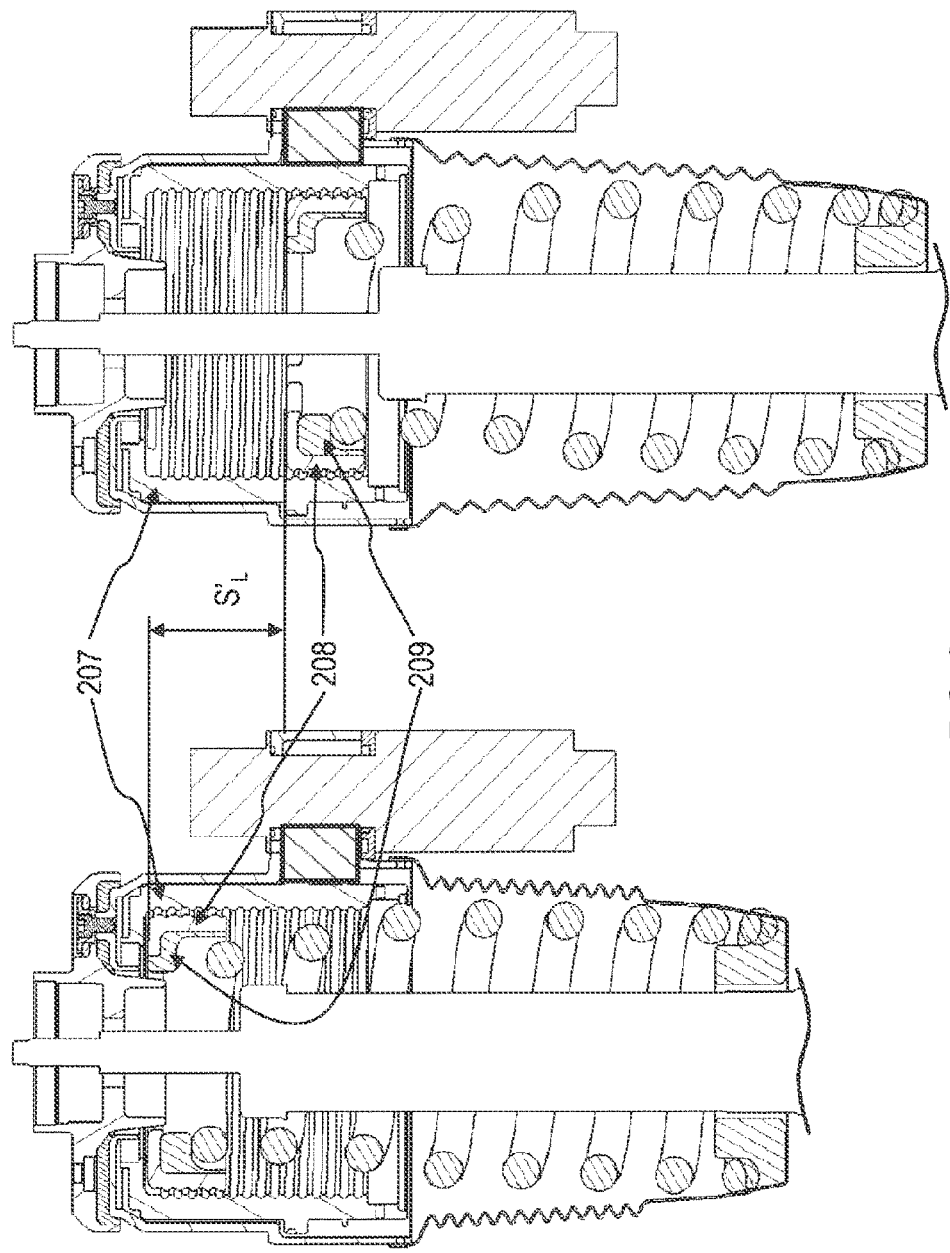
FIG. 6 shows cross-sectional views of the vehicle height adjustment unit of FIG. 1 in two operating states.

The configuration and operation of an electromechanical vehicle height adjustment unit 200 according to an embodiment will be described with reference to FIGS. 1 to 6. FIG. 1 is a schematic perspective view of the electromechanical vehicle height adjustment unit 200, which may be used in combination with the vehicle height adjustment unit 100 described in detail above. FIGS. 2 and 3 are cross-sectional views. FIG. 4 is a plan view. FIG. 5 shows a transmission that may be used in the electromechanical vehicle height adjustment unit 200. FIG. 6 shows cross sectional views of the electromechanical vehicle height adjustment unit 200 in two different positions.

Referring to FIGS. 1, 2, and 3, the electromechanical vehicle height adjustment unit 200 is a sprung mass unit. A top mount 205 is displaced relative to an upper spring pad 209 that receives an upper end of a vehicle spring 211.

The electromechanical vehicle height adjustment unit 200 has a compact design and affords ease of installation. For illustration, the electromechanical vehicle height adjustment unit 200 essentially makes use of the space required for the vehicle spring 211, with components of a displacement mechanism being arranged to overlap with the vehicle spring 211 and a damper housing along the axial direction of the spring 211.

The electromechanical vehicle height adjustment unit 200 comprises an electric motor 202 coupled to a rotary-to-linear motion conversion mechanism. In the present case, the electromechanical vehicle height adjustment unit 200 is operative to displace a top mount 205 relative to the upper spring pad (it being understood that displacement of the upper spring pad to 209 relative to the top mount 205 and displacement of the top mount 205 relative to the upper spring pad 209 are the same process).

The electromechanical vehicle height adjustment unit 200 may comprise the upper spring pad 209 operative to support an upper end of a vehicle spring 211, the top mount 205 that is displaceable relative to the upper spring pad 209, and the displacement mechanism coupled to the upper spring pad 209 and the top mount 205 and operative to displace the top mount 205 relative to the upper spring pad 209 in a height direction.

The displacement mechanism may comprise a rotary-to-linear motion conversion mechanism 207, 208, comprising a first member 207 that is rotatably mounted and a second member 208.

In one implementation of the electromechanical vehicle height adjustment unit 200, the second member 208 of the rotary-to-linear motion conversion mechanism 207, 208 may be fixed, e.g., relative to the upper spring pad 209. For illustration, the second member 208 may be provided such that it is secured against both translatory displacement and rotation relative to the upper spring pad 209. The first member 207 of the rotary-to-linear motion conversion mechanism 207, 208 may be provided such that it can move along a center axis of the second member 208 when it is being rotated.

In another implementation of the electromechanical vehicle height adjustment unit 200, the second member 208 of the rotary-to-linear motion conversion mechanism 207, 208 may be displaceable in a translatory member relative to, e.g., the upper spring pad 209, and the first member 207 of the rotary-to-linear motion conversion mechanism 207, 208 may be rotatably mounted while being secured against translatory displacement.

As best seen in FIG. 3, the first member 207 may have a first outer length $M'_{oP,oL}$ parallel to a center axis of the first member 207 and a first inner length $M'_{oP,iL}$ parallel to the center axis of the first member 207. The second member 208 may have a second outer length $M'_{iP,oL}$ parallel to a center axis of the second member 208 and a second inner length $M'_{iP,iL}$ parallel to the center axis of the second member 208.

The first outer length $M'_{oP,oL}$ may be at least 2.3 times the second outer length $M'_{iP,oL}$ and/or the first inner length $M'_{oP,iL}$ may be at least 2.1 times the second inner length $M'_{iP,iL}$.

The displacement mechanism comprises an electric motor 202 coupled to the rotary-to-linear motion conversion mechanism 207, 208 to drive the first member 207.

The second member 208 of the rotary-to-linear motion conversion mechanism 207, 208 may have an inner diameter $M'_{iP,iD}$ (best seen in FIG. 3) which may be greater than or equal to an outer diameter $VS'_{uoD}$ of an upper end of the vehicle spring 211.

The first member 207 and/or the second member 208 of the rotary-to-linear motion conversion mechanism 207, 208 may define an interior volume configured to receive at least a portion of the vehicle spring 211 therein. The upper spring pad 209 may be arranged in a cavity of the first member 207 and/or a cavity of the second member 208 of the rotary-to-linear motion conversion mechanism 207, 208. A compact construction may be attained thereby.

The top mount 205 may be operative for rigid attachment to a vehicle body.

The electromechanical vehicle height adjustment unit 200 may comprise a lower spring pad 215 operative to support a lower end of the vehicle spring 211. A damper 210 may extend from the top mount 205 through the displacement mechanism 207, 208, the vehicle spring 211, and the upper and lower spring pads 209, 215. The lower spring pad 215 may be connected to the damper 210. The lower spring pad 215 may be connected to the damper 210 at a fixed position along a longitudinal axis of the damper 210. The lower spring pad 215 may be coupled to the boot 206 at a lower end of the boot 206.

As shown in FIGS. 2, 3 and 6, a clearance (e.g. an annular gap) may be provided between the damper 210 and the second member 208 and/or the upper spring pad 209. In particular, a clearance (e.g., an annular gap) may be provided between a portion of the damper extending through the second member 208 and/or the upper spring pad 209 (which is a damper rod in the illustrated arrangement).

As further shown in FIGS. 2, 3 and 6, a clearance may also be provided between the first member 207 and the damper 210, in particular between the first member 207 and the damper rod. In this manner, the damper and/or damper rod may be given sufficient space for rotating around a hard point where the damper 210 is connected to the top mount.

A clearance (e.g., an annular gap) may also be provided between the damper 210 and the top mount 205. In particular, a clearance (e.g., an annular gap) may be provided between a portion of the damper 210 extending through the top mount 205 (which is the damper rod in the illustrated arrangement) and the top mount 205.

As further shown in FIGS. 2, 3 and 6, a clearance is also provided between the first member 207 and the outer diameter of the vehicle spring 211. When the vehicle is lowered (e.g., when the vehicle reaches its lowest position), the second member 208 and the upper spring pad 209 are retracted into the first member 207. A section of the spring 211 (e.g., at least 20%, at least 30% or at least 50% of the total length of the spring 211 at a respective levelling position) may then be received inside the first member 207. Sufficient clearance in order to enable all driven maneuvers (e.g., jounce and rebound at full left/right turning) at this position should thus be provided.

The displacement mechanism may be operative to position the top mount 205 at four different height positions or more than four different height positions relative to the upper spring pad 209. The displacement mechanism may be operative to position the top mount 205 at any height position of a continuous range of height positions relative to the upper spring pad 209.

The electromechanical vehicle height adjustment unit 200 may comprise a locking system 204 displaceable between a first configuration in which the locking system 204 permits displacement of the top mount 205 relative to the upper spring pad 209 and a second configuration in which the locking system 204 prevents displacement of the top mount 205 relative to the upper spring pad 209.

The locking system 204 may be operative to engage with a rotor of the electric motor 202 and/or with a shaft (not shown) of the electric motor 202. The locking system 204 may be arranged along, e.g., coaxially with, the rotor of the electric motor 202. The locking system 204 may be operative to engage with the first member 207 of the rotary-to-linear motion conversion mechanism. The locking system 204 may be arranged along, e.g., coaxially with, the first member 207 of the rotary-to-linear motion conversion mechanism. The locking system 204 may be operative to engage with a component (e.g., a drive gear 217, a driven gear 218, or a belt 219) of a transmission 214. The locking system 204 may be arranged along, e.g., coaxially with, the respective component of the transmission 214.

The locking system 204 may be a self-locking system in the sense that it prevents displacement of the top mount 205 relative to the upper spring pad 209 when no electric power is supplied to the locking system 204. Safety may be enhanced thereby.

The configuration of the locking system 204 is not particularly limited. Any electromechanical system may be used that can maintain a second configuration in which the rotor of the electric motor 202, a component of the transmission 214, or a component of the rotary-to-linear motion conversion mechanism 207, 208 is secured against movement without requiring electric power to be supplied to the locking system 204.

The locking system 204 may be configured to transition into the second configuration when the top mount 205 is positioned at any one of four or more than four different height positions relative to the upper spring pad 209. The locking system 204 may be configured to transition into the second configuration when the top mount 205 is positioned at any height position of a continuous range of height positions relative to the upper spring pad 209.

The electromechanical vehicle height adjustment unit 200 may comprise a control unit 222. The control unit 222 may comprise one or several integrated semiconductor circuits, such as processors, controllers, application specific integrated circuits (ASICs) or combinations thereof.

The control unit 222 may be provided locally at the spring 211 and/or at top mount 205 (e.g., rigidly attached to top mount 205). When the electromechanical vehicle height adjustment unit 200 is used in a vehicle height adjustment system comprising several electromechanical vehicle height adjustment units, as explained with reference to FIG. 7, the control unit 222 may control operation of the electric motors and locking systems of several electromechanical vehicle height adjustment units. The control unit 222 may be provided separately, e.g., as a central control unit of the height adjustment system. Alternatively, both local and central control units may be used for improved robustness and/or for sharing control tasks.

The control unit 222 may be operative to control activation and, optionally, a rotation speed of the electric motor 202. The control unit 222 may be operative to selectively control the locking system 204 to bring the locking system 204 into the first configuration in which it permits displacement of the top mount 205 relative to the upper spring pad 209.

The control unit 222 may be communicatively coupled to an acceleration sensor 223. The acceleration sensor 223 may be identical to the acceleration sensor 118. I.e., several different vehicle height adjustment units 100, 200 may each have a dedicated acceleration sensor or may share a joint acceleration sensor. The acceleration sensor 223 may be adapted to sense a vertical acceleration, e.g., an acceleration parallel to gravity and/or an acceleration perpendicular to a plane defined by the four wheels of the vehicle. The control unit 222 may control a rate at which the top mount 205 is displaced relative to the upper spring pad 209 as a function of an acceleration signal received from the acceleration sensor 223. Communication between the acceleration sensor 223 and the control unit 222 may be implemented via a wired connection 220 or by wireless communication.

The control unit 222 may be communicatively coupled to a height sensor 216. The height sensor 216 may be a mechanical sensor or may use other distance sensing techniques, such as an ultrasound sensor or radio sensor. Use of a height sensor 216 may be desirable because the height of the vehicle body varies as a function of vehicle weight.

The height sensor 216 may provide a height signal to the control unit 222. The height signal may be indicative of the height of the vehicle body relative to a reference height (e.g., the vehicle body height of the vehicle without passengers and without any additional load). The height signal may be indicative of a change or rate of change of the height of the vehicle body. The control unit 222 may be adapted to use the height signal to determine at which position the top mount 205 is to be positioned relative to the upper spring pad 209. For illustration, the control unit 222 may use look-up tables and/or algorithms to determine the desired position of the top mount 205 relative to the upper spring pad 209, taking into account a height offset of the vehicle body that is caused by added weight, such as luggage or passengers.

The control unit 222 may determine the position of the top mount 205 relative to the upper spring pad 209 as a function the height signal from the height sensor 216 and optionally based on additional information. For illustration, information on a target height of the vehicle body above ground level may be determined by the control unit 222 based on a user input via a human machine interface and/or based on sensor signals that indicate the present usage of the vehicle (e.g., driving on a road or in off-road terrain and/or passengers entering or leaving the vehicle).

The control unit 222 may also be operative to perform safety related functions.

The control unit 222 may be operative to activate the locking system 204 to place the locking system 204 into the first configuration when a height adjustment operation is performed. In response to detection of a malfunction of the locking system 204, the control unit 222 may cause a warning signal to be output to a driver of the vehicle and/or may activate the electric motor 202 to displace the top mount 205 relative to the upper spring pad 209 to a defined safe state position.

The electromechanical vehicle height adjustment unit 200 may comprise a transmission 214 coupled between the electric motor 202 and the first member 207 of the rotary-to-linear motion conversion mechanism 207, 208. The transmission 214 may comprise a belt drive 219, a gear or a gear train 217, 218.

As described for the electromechanical vehicle height adjustment unit 100, the displacement mechanism may be operative to output electric energy for storing in a rechargeable energy storage device 203 in response to a vehicle lowering operation. To this end, the electric motor 202 may be a direct current (DC) motor 202, and the displacement mechanism may be operative such that displacement of the top mount 205 during the vehicle lowering operation effects a rotation of a rotor of the electric motor 202 to output the electric energy via terminals of the electric motor 202.

Importantly, and as will be explained in more detail with reference to FIGS. 14 and 15 below, the control unit 222 may be operative to control energy recuperation.

The electromechanical vehicle height adjustment unit 200 may comprise the rechargeable energy storage device 203 and circuitry operative to effect charging of the rechargeable energy storage device 203 with the electric energy output by the displacement mechanism and/or to effect discharging of the rechargeable energy storage device 203 to the electric motor 202 and/or the locking system 204 to perform a vehicle raising operation.

The rechargeable energy storage device 203 may be provided locally as a secondary power unit. The rechargeable energy storage device 203 may be provided in addition to, and may be separate and distinct from, a vehicle battery (e.g., a 12V or 48V traction battery or other vehicle battery). The rechargeable energy storage device 203 may include one or more capacitors, for example. As illustrated in FIGS. 1 to 3, the rechargeable energy storage device 203 may be provided proximate the electric motor 202.

During a lowering operation, the control unit 222 may selectively bring the locking system 204 into its first configuration in which the locking system 204 permits displacement of the upper spring pad 209 relative to the top mount 205. Under the influence of gravity, the vehicle body will cause the top mount 205 to move towards the upper spring pad 209. During the lowering operation, downward movement of the top mount 205 drives the rotor of the electric motor 202 via the rotary-to-linear motion conversion mechanism (which converts the linear downward movement of the top mount 205 into a rotary movement of the rotor of the electric motor 202 during the lowering operation). The electric motor 202 operates as a generator during the lowering operation. Electric energy output by the electric motor 202 during the lowering operation may be stored in the rechargeable energy storage device 203. Alternatively, electric energy output by the electric motor 202 during the lowering operation may be supplied to a primary power unit 221, which may be a 12V or 48V vehicle battery. A separate generator (not shown) could be employed instead of the electric motor to generate the electric energy.

The control unit 222, electric motor 202, and locking system 204 may be electrically coupled to the rechargeable energy storage device 203. During a raising operation, the control unit 222 may cause energy to be supplied by the rechargeable energy storage device 203 for activating the electric motor 202 and/or the locking system 204. The control unit 222, electric motor 202, and locking system 204 may be electrically coupled, via conductors 220, to the primary power unit 221. The primary power unit 221 may be the 12V or 48V vehicle battery, such as a traction battery. Energy from the primary power unit 221 may be used for powering one or several of the control unit 222 and locking system 204 during a lowering operation and/or for powering one or several of the control unit 222, electric motor 202, and locking system 204 during a raising operation when the energy stored in the rechargeable energy storage device 203 is insufficient for reliable operation.

The displacement mechanism may be operative to displace the top mount 205 by at least 60 mm relative to the upper spring pad 209.

The first member 207 of the rotary-to-linear motion conversion mechanism 207, 208 may be a ball screw nut having an internal thread and the second member 208 of the rotary-to-linear motion conversion mechanism 207, 208 may be a ball screw shaft having an external thread.

The first member 207 of the rotary-to-linear motion conversion mechanism 207, 208 may be a lead screw shaft having an internal thread and the second member 208 of the rotary-to-linear motion conversion mechanism 207, 208 may be a screw nut having an external thread.

The first member 207 of the rotary-to-linear motion conversion mechanism 207, 208 may be a hollow element defining a cavity therein.

The second member 208 of the rotary-to-linear motion conversion mechanism 207, 208 may be a hollow element defining a cavity therein, e.g. a hollow shaft.

A shaft of the electric motor 202 may be not coaxial with the first member 207 of the rotary-to-linear motion conversion mechanism 207, 208. The shaft of the electric motor 202 may, however, be parallel to the first member 207.

The electromechanical vehicle height adjustment unit 200 may be a front axle height adjustment unit, without being limited thereto.

Further geometrical characteristics that may be advantageous for the electromechanical vehicle height adjustment unit 200 are described with reference to FIG. 3. In the following description of FIG. 3, the term "length" refers to dimensions measured parallel to a center axis of the first member 207 of the rotary-to-linear motion conversion mechanism. The term "diameter" refers to a dimension measured in a plane perpendicular to the center axis of the first member 207 of the rotary-to-linear motion conversion mechanism. For non-circular elements, i.e., for elements in which the diameter may vary as a function direction around the center axis of the first member 207, the diameter may be determined based on a cross-sectional area A inscribed into (inner diameter) or circumscribed around (outer diameter) the respective element as $d=2\times[A/\pi]^{0.5}$.

The first member 207 of the rotary-to-linear motion conversion mechanism may be a ball screw nut having an internal thread and the second member 208 of the rotary-to-linear motion conversion mechanism may be a ball screw shaft having an external thread. A ball center diameter $M'_{BCD}$ (measured between center lines of balls on opposing sides of the ball screw nut 207) may be at least 10 times a diameter of each of the balls, preferably at least 12 times a diameter of each of the balls, preferably at least 15 times a diameter of each of the balls.

A housing 201, in which the first member 207 and second member 208 are arranged has an outer diameter $H'_{OD}$. The outer diameter $H'_{OD}$ may be measured for a cylindrical section of the housing 201. The outer diameter $H'_{OD}$ of the housing may be at least 1.1 times the inner diameter $M'_{iP,iD}$ of the second member 208 of the rotary-to-linear motion conversion mechanism 207, 208, preferably at least 1.2 times the inner diameter $M'_{iP,iD}$ of the second member 208 of the rotary-to-linear motion conversion mechanism 207, 208, preferably at least 1.3 times the inner diameter $M'_{iP,iD}$ of the second member 208 of the rotary-to-linear motion conversion mechanism 207, 208.

The displacement mechanism may be operative to displace the top mount 205 between a lowest position and a highest position relative to the upper spring pad 209. A distance between the lowest position and the highest position defines a stroke length $S'_L$ of the displacement mechanism (best seen in FIG. 6). A ratio between a maximum outer diameter $M_{oP,oD}$ of the first member 207 of the rotary-to-linear motion conversion mechanism 207, 208 and the stroke length $S'_L$ may be at least 2.

The first member 207 of the rotary-to-linear motion conversion mechanism 207, 208 has a first outer diameter $M'_{oP,oD}$ and the second member 208 of the rotary-to-linear motion conversion mechanism 207, 208 has a second inner diameter $M'_{iP,iD}$. The first outer diameter $M'_{oP,oD}$ may be greater than 1.2 times the second inner diameter $M'_{iP,iD}$.

FIG. 4 is a plan view of the electromechanical vehicle height adjustment unit 200. An isolation pad 213 (best seen in FIGS. 2 and 3), may be interposed between an upper axial end face of the housing 201 and the top mount 205. The isolation pad 213 may provide electrical and/or mechanical insulation between the displacement mechanism and the top mount 205. Isolation washers 212 may be provided on the top mount 205 in association with screws that pass through the top mount 205 towards the isolation pad 213.

FIG. 5 is a plan view of a transmission 214 that may be interconnected between the electric motor 202 and the first member 207 of the rotary-to-linear motion conversion mechanism. The transmission 214 may comprise a drive gear 217, a driven gear 218, and a drive belt 219. The transmission 214 may be configured to provide speed reduction and torque increase. I.e., the transmission 214 may apply a torque to the first member 207 of the rotary-to-linear motion conversion mechanism that may be greater than a torque applied by the electric motor 202 onto the drive gear 217. For illustration, the transmission 214 may be adapted such that, during rotation of the drive gear 217, an angular velocity of the driven gear 218 is at most ⅓, at most ⅕, or at most ⅐ times an angular velocity of the drive gear 217.

Other configurations of the transmission 214 may be used. For illustration, transmissions 214 including a gear train or including at least one gear may be used.

FIG. 6 shows cross-sectional views of the electromechanical vehicle height adjustment unit 200 in two different operating states. The left part in FIG. 6 shows a state in which the upper spring pad 209 and the second member 208 are at their position closest to the top mount 205. Rotation of the first member 207, while concurrently bringing the locking system 204 into its first configuration in which it permits displacement of the top mount 205 relative to the upper spring pad 208, displaces the top mount 205 relative to the second member 208 and the upper spring pad 209 so as to increase a spacing between the upper spring pad 209 and the top mount 205. An end position, shown on the right side of FIG. 6, is determined by the first member 207 and the second member 208 of the rotary-to-linear motion conversion mechanism.

Various effects and advantages are attained by the electromechanical vehicle height adjustment unit 200 according to embodiments. For illustration, a compact construction is attained.

Vehicle and Vehicle Height Adjustment System

Figure 7:
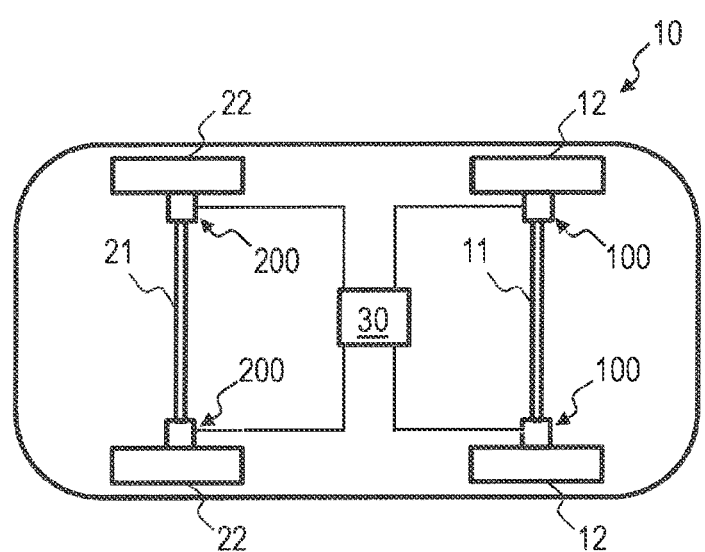
FIG. 7 is a schematic representation of a vehicle comprising two vehicle height adjustment units of FIGS. 1 to 6 and two further vehicle height adjustment units.

FIG. 7 is a schematic representation of a vehicle 10. The vehicle 10 may be a car, a bus, a lorry, or another vehicle. The vehicle 10 may be a hybrid or electric vehicle.

A vehicle height adjustment system may include several electromechanical vehicle height adjustment units 200, which may respectively be configured and operative as explained with reference to FIGS. 1 to 6. The electromechanical vehicle height adjustment units 200 may be provided for height adjustment at a front axle 21, to raise or lower a part of the vehicle body relative to front wheels 22.

The vehicle height adjustment system may include several further electromechanical vehicle height adjustment units 100, which may respectively have a configuration different from the electromechanical vehicle height adjustment units 200. The further electromechanical vehicle height adjustment units 100 may be provided for height adjustment at a rear axle 11, to raise or lower a part of the vehicle body relative to rear wheels 12. A possible configuration of the further electromechanical vehicle height adjustment units 100 in a vehicle height adjustment system and a vehicle according to embodiments will be explained in detail with reference to FIGS. 8 to 13. The further electromechanical vehicle height adjustment units 100 may be unsprung mass units, and the electromechanical vehicle height adjustment units 200 may be sprung mass units.

The vehicle height adjustment system may comprise a control unit 30, which may be operative to control the electric motors and the locking systems of the vehicle height adjustment units 200 and of the further electromechanical vehicle height adjustment units 100. The control unit 30 may perform the operations described with reference to the control unit 222 of FIGS. 1 to 6, but may perform additional control operations for the further electromechanical vehicle height adjustment units 100.

Each one of the electromechanical vehicle height adjustment units 200 and of the further electromechanical vehicle height adjustment units 100 may respectively comprise a separate local rechargeable energy storage device, e.g., a local power pack, for performing recuperation. In alternative configurations, one rechargeable energy storage device for electric energy may be provided for two or more of the units 100, 200.

Electromechanical Vehicle Height Adjustment Unit Integrated with Lower Control Arm FIGS. 8 to 13 show a further vehicle height adjustment unit 100 or components thereof. The electromechanical vehicle height adjustment unit 100 may be used to provide rear axle height adjustment, for example.

As will be appreciated from FIGS. 8 to 13, the further vehicle height adjustment unit 100 is different in construction and operation from the previously described vehicle height adjustment unit 200. The further electromechanical vehicle height adjustment unit 100 may be an unsprung mass unit.

The further electromechanical vehicle height adjustment unit 100 is generally operative to displace a lower spring pad 106. A lower end of a vehicle spring 109 is supported on the lower spring pad 106. A vehicle body may be supported on an upper end of the vehicle spring 109. By displacing the lower spring pad 106, a height adjustment can be performed for the vehicle body.

The further electromechanical vehicle height adjustment unit 100 is operative to effect displacement of the lower spring pad 106 without using hydraulic or pneumatic components. The further electromechanical vehicle height adjustment unit 100 is provided on and at least partially integrated with a lower control arm 101. At least some of the components that effect displacement of the lower spring pad 106 may be arranged fully in a cavity of the lower control arm 101 or may extend into a cavity or recess of the lower control arm 101. Such a design provides a compact construction and facilitates installation of the lower control arm 101 and the integrated displacement mechanism for the lower spring pad 106. By integrating the displacement mechanism for the lower spring pad 106 with the lower control arm 101, an active lower control arm is provided, which may be installed in the vehicle as a single integral unit.

At least some of the components that effect displacement of the lower spring pad 106 may be arranged to extend into an interior of the vehicle spring 109. Such a design provides a compact construction and facilitates installation.

The further electromechanical vehicle height adjustment unit 100 comprises an electric motor 102, a rotary-to-linear motion conversion mechanism, and the lower spring pad 106. These components may be mounted on the lower control arm 101. At least some of these components may be arranged to extend into an interior of the lower control arm 101. The further electromechanical vehicle height adjustment unit 100 may comprise additional components, such as a transmission 105 and/or a secondary power pack 103 that may be mounted on and may optionally extend into the lower control arm 101.

The electric motor 102 may be coupled, via the transmission 105, to the rotary-to-linear motion conversion mechanism.

The rotary-to-linear motion conversion mechanism comprises a first member 107 that is rotatably mounted and a second member 108 that is mounted so as to be displaceable in a translatory manner. The second member 108 may be secured against rotation. The second member 108 may be attached to or formed integrally with the lower spring pad 106.

The rotary-to-linear motion conversion mechanism may have various configurations. For illustration, the first member 107 of the rotary-to-linear motion conversion mechanism may be a ball screw shaft having an external thread and the second member 108 of the rotary-to-linear motion conversion mechanism may be a ball screw nut having an internal thread. The first member 107 of the rotary-to-linear motion conversion mechanism may be a lead screw shaft having an external thread and the second member 108 of the rotary-to-linear motion conversion mechanism may be a screw nut having an internal thread.

The further electromechanical vehicle height adjustment unit 100 may comprise a locking system 104. The locking system 104 may be operative to engage with a rotor of the electric motor 102 and/or a shaft (not shown) of the electric motor 102. The locking system 104 may be arranged along, e.g., coaxially with, the rotor of the electric motor 102 and/or a shaft (not shown) of the electric motor 102. The locking system 104 may be operative to engage with the first member 107 of the rotary-to-linear motion conversion mechanism. The locking system 104 may be arranged along, e.g., coaxially with, the first member 107 of the rotary-to-linear motion conversion mechanism. The locking system 104 may be operative to engage with component (e.g., a drive gear 113, a driven gear 114 or a belt 115) of the transmission 105. The locking system 104 may be arranged along, e.g., coaxially with, the component of the transmission 105.

The locking system 104 may be a self-locking system in the sense that it prevents displacement of the lower spring pad 106 relative to the lower control arm 101 when no electric power is supplied to the locking system 104. Safety may be enhanced thereby.

The locking system 104 may have a first configuration in which it permits displacement of the lower spring pad 106. The locking system 104 may have a second configuration in which it prevents displacement of the lower spring pad 106. The further electromechanical vehicle height adjustment unit 100 may be adapted such that the locking system 104 is selectively displaced into the first configuration to permit displacement of the lower spring pad 106 when the electric motor 102 drives the rotary-to-linear motion conversion mechanism in a raising operation or when a vehicle lowering operation is performed.

The configuration of the locking system 104 is not particularly limited. Any electromechanical system that can maintain a second configuration in which the rotor of the electric motor 102, a component of the transmission 105, or a component of the rotary-to-linear motion conversion mechanism 107, 108 is secured against movement, in particular without requiring electric power to be supplied to the locking system 104 may be used.

The further electromechanical vehicle height adjustment unit 100 may comprise a shaft protector 111. The shaft protector 111 may be arranged in an interior of the vehicle spring 109. The shaft protector 111 may cover the first member 107 of the rotary-to-linear motion conversion mechanism to prevent contact between the vehicle spring 109 and the first member 107 of the rotary-to-linear motion conversion mechanism.

The further electromechanical vehicle height adjustment unit 100 may comprise a boot 110. The boot 110 may be mounted on the lower control arm 101. The lower spring pad 106 may be displaceable within the boot 110. The lower end of the vehicle spring may be seated between the displaceable lower spring pad 106 and a wall surface of the boot 110, at least when the lower spring pad 106 is in its lowest position.

Figure 8:
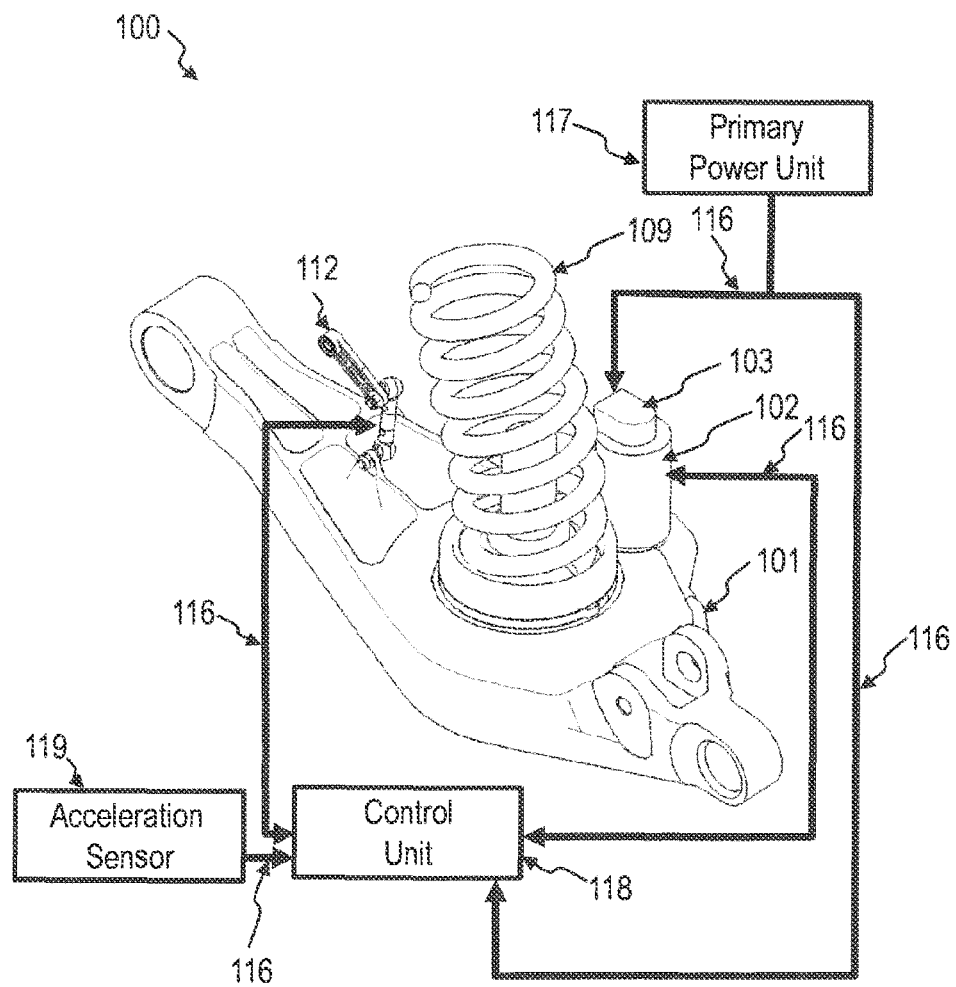
FIG. 8 is a schematic perspective view of a further vehicle height adjustment unit that may be used in the vehicle of FIG. 7.

FIG. 8 also shows schematic representations of electric components and sensors, which may be used to activate the displacement mechanism of the electromechanical vehicle height adjustment unit 100.

The further electromechanical vehicle height adjustment unit 100 may comprise a control unit 118. The control unit 118 may comprise one or several integrated semiconductor circuits, such as processors, controllers, application specific integrated circuits (ASICs) or combinations thereof.

The control unit 118 may be provided locally on the lower control arm 101. When the further electromechanical vehicle height adjustment unit 100 is comprised by a vehicle height adjustment system comprising several electromechanical vehicle height adjustment units, as was explained with reference to FIG. 8, the control unit 118 may control operation of the electric motors and locking systems of several electromechanical vehicle height adjustment units. The control unit 118 may be provided separately from the unit 100, e.g., as a central control unit. Alternatively, both local and central control units may be used for improved robustness and/or for sharing control tasks.

The control unit 118 may be operative to control activation and, optionally, a rotation speed of the electric motor 102. The control unit 118 may be operative to selectively control the locking system 104 to displace the locking system 104 into the first configuration in which it permits displacement of the lower spring pad 106.

The control unit 118 may be communicatively coupled to an acceleration sensor 119. The acceleration sensor 119 may be adapted to sense a vertical acceleration, e.g., acceleration parallel to gravity and/or an acceleration perpendicular to a plane defined by the four wheels of the vehicle. The control unit 118 may control a rate at which the lower spring pad 106 is displaced as a function of an acceleration signal received from the acceleration sensor 119. Communication between the acceleration sensor 119 and the control unit 118 may be implemented via a wired connection 116 or by wireless communication.

The control unit 118 may be communicatively coupled to a height sensor 112. The height sensor 112 may be a mechanical sensor or may use other distance sensing techniques, such as an ultrasound sensor or radio sensor. Use of a height sensor 112 may be desirable because the height of the vehicle body varies as a function of vehicle weight, e.g., as a function of the number and weight of passengers or as a function of luggage or other load weight. Communication between the height sensor 112 and the control unit 118 may be implemented via a wired connection 116 or by wireless communication.

The height sensor 112 may provide a height signal to the control unit 118. The height signal may be indicative of the height of the vehicle body relative to a reference height (e.g., the vehicle body height of the vehicle without passengers and without any additional load). The height signal may be indicative of a change or rate of change of the height of the vehicle body. The control unit 118 may be adapted to use the height signal to determine at which position the lower spring pad 106 is to be positioned. For illustration, the control unit 118 may use look-up tables and/or algorithms to determine the desired position of the lower spring pad 106, taking into account a height offset of the vehicle body that is caused by added weight, such as luggage or passengers.

The control unit 118 may determine the position of the lower spring pad 106 as a function of the height signal from the height sensor 112 and optionally based on additional information. For illustration, information on a target height of the vehicle body above ground level may be determined by the control unit 118 based on a user input via a human machine interface and/or based on sensor signals that indicate the present usage of the vehicle (e.g., driving on a road or in off-road terrain).

Figure 9:
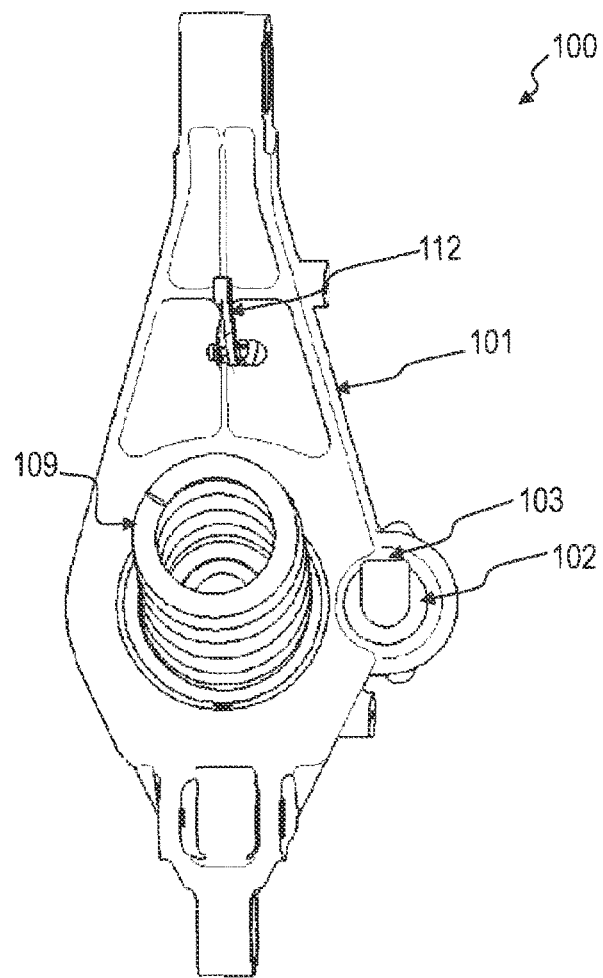
FIG. 9 is another perspective view of the further vehicle height adjustment unit of FIG. 8.

As will be explained in more detail with reference to FIGS. 14 and 15 below, the control unit 118 may be operative to control energy recuperation. The further electromechanical vehicle height adjustment unit 100 may include a rechargeable energy storage device 103, which may be provided locally on the control arm 101 as a secondary power unit. The rechargeable energy storage device 103 may be provided in addition to, and may be separate and distinct from, a vehicle battery (e.g., a 12V or 48V traction battery or other vehicle battery). The rechargeable energy storage device 103 may include one or more capacitors, for example. As illustrated in FIGS. 8 and 9, the rechargeable energy storage device 103 may be provided at the lower control arm 101, e.g., proximate the electric motor 102.

During a lowering operation, the control unit 118 may selectively bring the locking system 104 into its first configuration in which the locking system 104 permits displacement of the lower spring pad 106. Under the influence of gravity, the vehicle body will cause the lower spring pad 106 to move towards a seat on the lower control arm 101.

During the lowering operation, such downward movement of the lower spring pad 106 may drive the rotor of the electric motor 102 via the rotary-to-linear motion conversion mechanism (which converts the linear downward movement of the lower spring pad 106 into a rotary movement of the rotor of the electric motor 102 during the lowering operation). The electric motor 102 then operates as a generator during the lowering operation. Electric energy output by the electric motor 102 during the lowering operation may be stored in the rechargeable energy storage device 103. Alternatively, electric energy output by the electric motor 102 during the lowering operation may be supplied to a primary power unit 117. A separate generator could be used instead of the motor 102 to generate the electric energy.

The control unit 118, electric motor 102, and locking system 104 may be electrically coupled to the rechargeable energy storage device 103. During a raising operation, the control unit 118 may cause energy to be supplied by the rechargeable energy storage device 103 for activating the electric motor 102 and/or the locking system 104.

The control unit 118, electric motor 102, and locking system 104 may be electrically coupled, via conductors 116, to the primary power unit 117. The primary power unit 117 may be the 12V or 48V vehicle battery, such as a traction battery. Energy from the primary power unit 117 may be used for powering one or several of the control unit 118 and locking system 104 during a lowering operation and/or for powering one or several of the control unit 118, electric motor 102, and locking system 104 during a raising operation. Energy from the primary power unit 117 may be used selectively, depending on whether there is sufficient energy left in the local secondary power pack 103.

The control unit 118 may perform additional functions, such as safety related functions. For illustration, in response to detection of a malfunction of the locking system 104, the control unit 118 may cause activation of the electric motor 102 to displace the lower spring pad 106 to a defined safe state position. The defined safe state position may be a lowest position of the lower spring pad 106, for example.

When there is a malfunction of the electric motor 102, the rechargeable energy storage device 103, and/or the primary power unit 117, the locking system 104 in its second configuration prevents an unintentional displacement of the lower spring pad 106.

Figure 11:
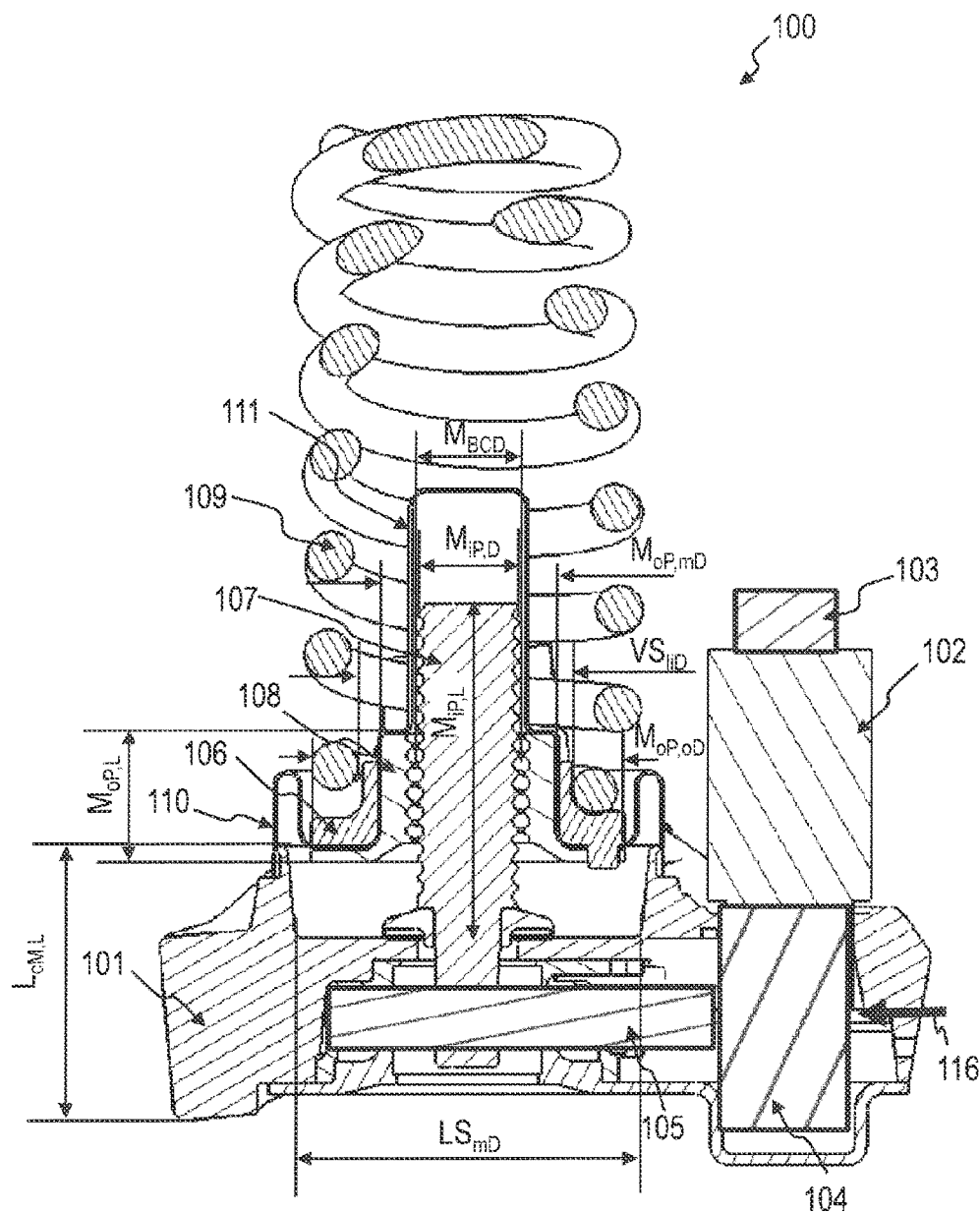
FIG. 11 is a cross-sectional view of the further vehicle height adjustment unit of FIG. 8.

FIG. 11 shows an enlarged cross-sectional view of the electromechanical vehicle height adjustment unit 100. Geometrical features of the further electromechanical vehicle height adjustment unit 100 according to exemplary embodiments, which aid in providing compact construction space with reliable operation, will be described in detail with reference to FIG. 11.

In the following description of geometrical characteristics, the term "length" or "height" refer to dimensions measured parallel to a center axis of the first member 107 of the rotary-to-linear motion conversion mechanism. The term "diameter" refers to a dimension measured in a plane perpendicular to the center axis of the first member 107 of the rotary-to-linear motion conversion mechanism. For non-circular elements, i.e., for elements in which the diameter may vary as a function of a direction around the center axis of the first member 107, the diameter may be determined based on a cross-sectional area A inscribed into (inner diameter) or circumscribed around (outer diameter) the respective element as $d=2\times[A/\pi]^{0.5}$.

The second member 108 of the rotary-to-linear motion conversion mechanism has a middle diameter $M_{oP,mD}$, which is at most the diameter of the center opening of the lower spring pad 106. The middle diameter $M_{oP,mD}$ may be the external or larger diameter of the outer part of the rotary-to-linear motion conversion mechanism measured at an upper end plane of the outer part of the rotary-to-linear motion conversion mechanism, the upper end plane being orthogonal to a longitudinal center axis of the outer part of the rotary-to-linear motion conversion mechanism. The middle diameter $M_{oP,mD}$ may be at least 1.2, preferably at least 1.3, preferably at least 1.4, preferably at least 1.5 of an outer diameter $M_{iP,D}$ of the first member 107 of the rotary-to-linear motion conversion mechanism. The outer diameter $M_{iP,D}$ of the first member 107 of the rotary-to-linear motion conversion mechanism may be a pitch diameter or a major diameter of the first member 107 of the rotary-to-linear motion conversion mechanism.

The outer one of the members 107, 108 of the rotary-to-linear conversion mechanism (which, in the depicted embodiment, is the second member 108 of the rotary-to-linear conversion mechanism) has an outer diameter $M_{oP,oD}$, which is at most the outer diameter of the lower spring pad 106.

The outer diameter $M_{oP,mD}$ may be at least 1.2, preferably at least 1.3, preferably at least 1.4 of the middle diameter $M_{oP,mD}$ of the outer one of the members 107, 108 of the rotary-to-linear conversion mechanism. The middle diameter $M_{oP,mD}$ of the outer one of the members 107, 108 of the rotary-to-linear conversion mechanism may be at most the diameter of the center opening of the lower spring pad 106.

The first member 107 of the rotary-to-linear motion conversion mechanism may be a ball screw shaft having an external thread. The second member 108 of the rotary-to-linear motion conversion mechanism may be a ball screw nut having an internal thread. A ball center diameter $M_{BCD}$ (measured between center lines of balls on opposing sides of the ball screw shaft 107) may be at least 3 times a diameter of each of the balls, preferably at least 3.5 times a diameter of each of the balls, preferably at least 4 times a diameter of each of the balls.

The lower end of the vehicle spring 109 may have an inner diameter $VS_{liD}$ which may be equal to or greater than the middle diameter of the second member 108.

The control arm 101 may be a lower control arm 101 having a seat for at least part of the rotary-to-linear motion conversion mechanism. The seat may have a diameter $LS_{mD}$, at its lower end, with the diameter being measured in a plane that includes the center axis of the first member 107, as illustrated in FIG. 11. The seat diameter $LS_{mD}$ may be at least 0.5 times an outer diameter $M_{oP,oD}$ of the second member 108 of the rotary-to-linear conversion mechanism, preferably at least 0.7 times the outer diameter $M_{oP,oD}$ of the second member 108.

The first member 107 of the rotary-to-linear motion conversion mechanism may have a length $M_{iP,L}$ along the center axis of the first member 107. The length $M_{iP,L}$ may be measured from a plane defined by the lower surface of the seat in the control arm 101 through which the first member 107 projects to an axial end surface of the first member 107 along the center axis of the first member 107.

The length $M_{iP,L}$ may be at least equal to a length $M_{oP,L}$ of the second member 108 of the rotary-to-linear motion conversion mechanism, preferably at least 1.2 times the length $M_{oP,L}$ of the second member 108 of the rotary-to-linear motion conversion mechanism, preferably at least 1.4 times the length $M_{oP,L}$ of the second member 108 of the rotary-to-linear motion conversion mechanism, preferably at least 1.5 times or at least 2.0 times or at least 2.5 times or at least 3.0 times the length $M_{oP,L}$ of the second member 108 of the rotary-to-linear motion conversion mechanism. The length $M_{iP,L}$ may be from 3.0 to 3.5 times the length $M_{oP,L}$ of the second member 108 of the rotary-to-linear motion conversion mechanism. The length $M_{oP,L}$ of the second member 108 may be measured as distance between the two terminal planes of the second member 108 that are orthogonal to the center axis of the first member 107.

The lower control arm 101 has a lower control arm height $L_{cM,L}$, measured as distance between the lines intersecting the top and bottom points of the lower control arm 101, with the lines being located in a plane that includes the center axis of the first member 107. The length $M_{iP,L}$ of the first member 107 of the rotary-to-linear motion conversion mechanism may be at least 0.7 times the lower control arm height, preferably at least 0.8 times the lower control arm height, preferably at least 0.9 times the lower control arm height, preferably at least 1.0 times the lower control arm height, preferably at least 1.1 times the lower control arm height $L_{cM,L}$.

Figure 13:
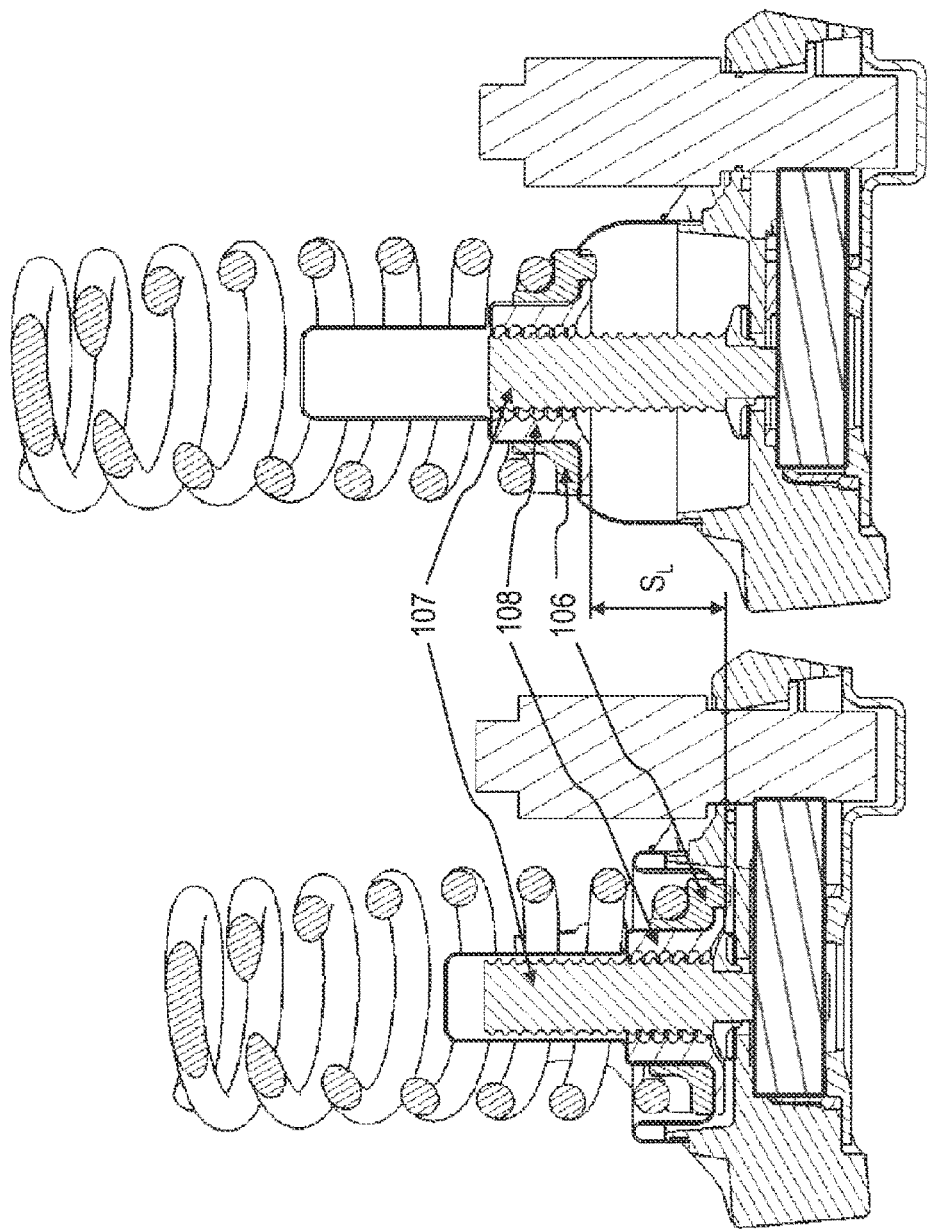
FIG. 13 shows cross-sectional views of the further vehicle height adjustment unit of FIGS. 8 to 12 in two operating states.

The outer one of the members 107, 108 of the rotary-to-linear conversion mechanism (which, in the depicted embodiment, is the second member 108 of the rotary-to-linear conversion mechanism) has an outer diameter $M_{oP,oD}$ that may be equal to or greater than 1.5 times a stroke length $S_L$ of the displacement mechanism. The stroke length $S_L$ of the displacement mechanism may be the maximum displacement of the lower spring pad 106 along the first member 107 of the rotary-to-linear motion conversion mechanism, as illustrated in FIG. 13.

Figure 12:
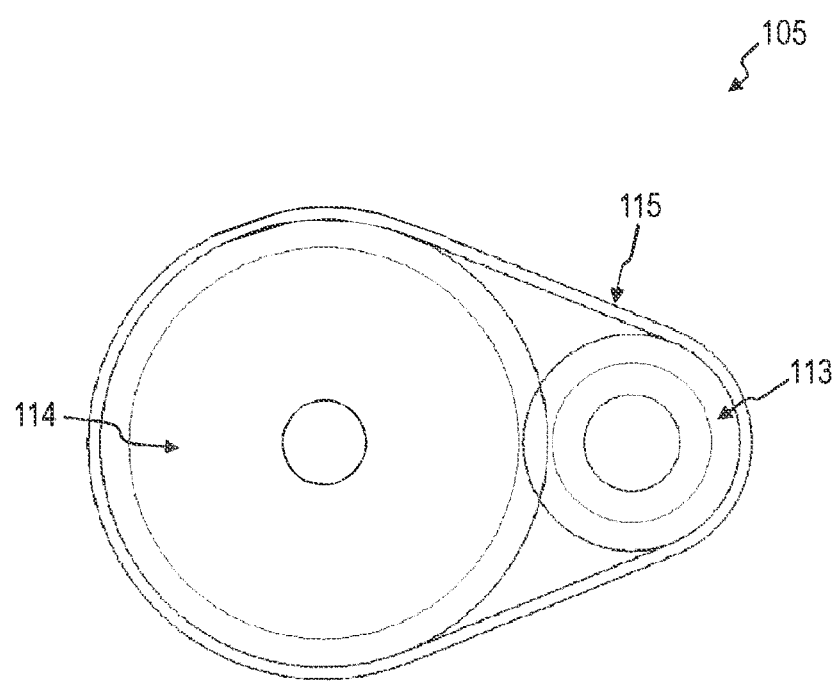
FIG. 12 is a plan view of a transmission that may be used in the further vehicle height adjustment unit of FIGS. 8 to 11.

FIG. 12 is a plan view of a transmission 105 that may be interconnected between the electric motor 102 and the first member 107 of the rotary-to-linear motion conversion mechanism. The transmission 105 may comprise a drive gear 113, a driven gear 114, and a drive belt 115. The transmission 105 may be configured to provide speed reduction and torque increase. I.e., the transmission 105 may apply a torque to the first member 107 of the rotary-to-linear motion conversion mechanism that may be greater than a torque applied by the electric motor 102 onto the drive gear 113. For illustration, the transmission 105 may be adapted such that, during rotation of the drive gear 113, an angular velocity of the driven gear 114 is at most ⅓, at most ⅕, or at most ⅐ times an angular velocity of the drive gear 113.

The transmission 105 may be adapted such that, during rotation of the drive gear 113, an angular velocity of the driven gear 114 is from 1/30 to ⅓ times an angular velocity of the drive gear 113.

Figure 10:
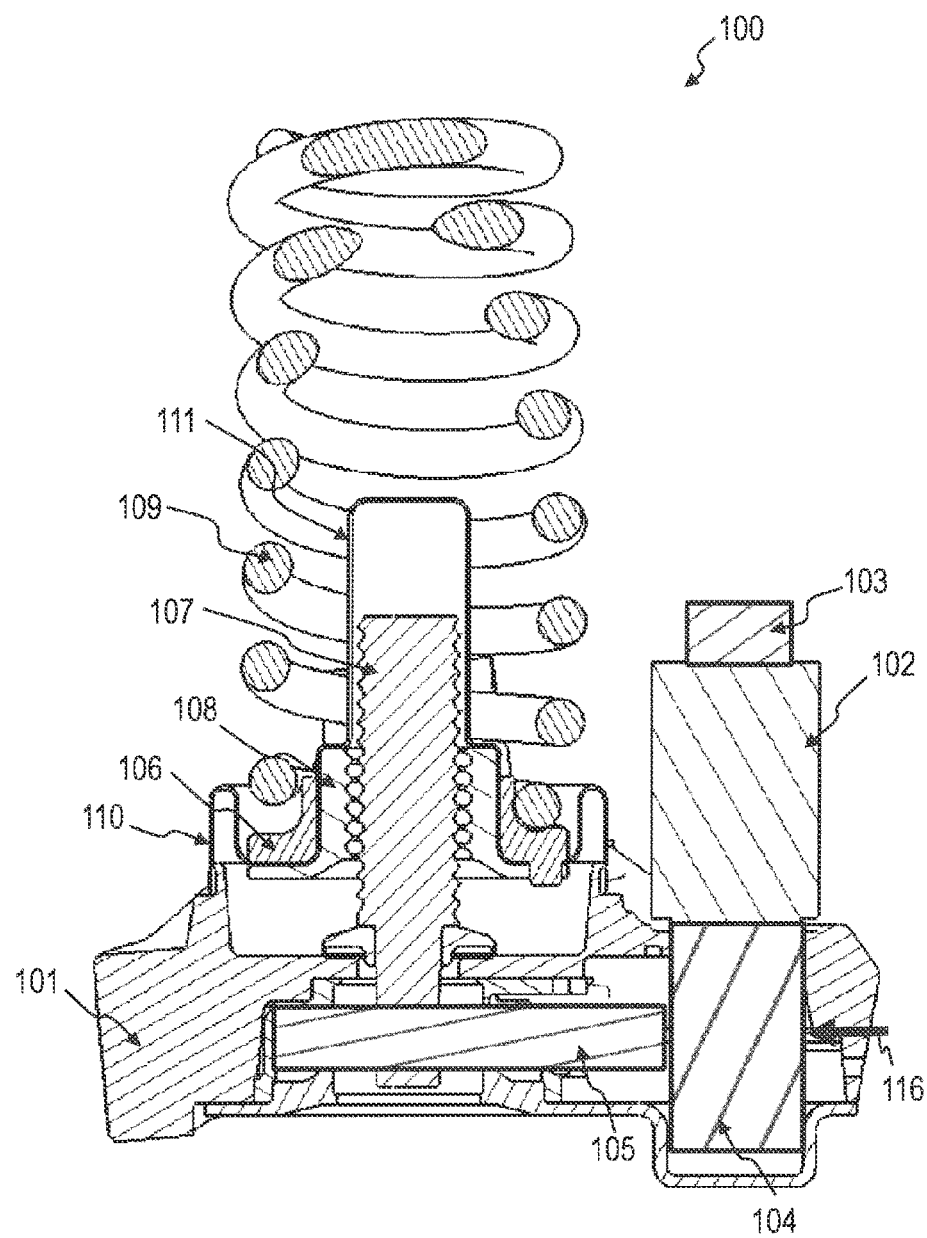
FIG. 10 is a cross-sectional view of the further vehicle height adjustment unit of FIG. 8.

As best seen in the cross-sectional views of FIGS. 10, 11, and 12, the transmission 105 may be completely or partly housed in a cavity of the lower control arm 101. In other embodiments, the transmission 105 may extend into a cavity of the lower control arm 101. A compact construction can be attained thereby.

Other configurations of the transmission 105 may be used in other embodiments. For illustration, transmissions 105 including a gear train or including at least one gear may be used in other embodiments.

FIG. 13 shows cross-sectional views of the further electromechanical vehicle height adjustment unit 100 in two different operating states. The left part of FIG. 13 shows a state in which the second member 108 and the lower spring pad 106 are at the lowest position. Rotation of the first member 107, while concurrently bringing the locking system 104 into the first configuration in which it permits displacement of the lower spring pad 106, displaces the second member 108 and the lower spring pad 106 upward. An end position, shown on the right side of FIG. 13, is determined by the first member 107 and second member 108 of the rotary-to-linear motion conversion mechanism.

Various effects and advantages are attained by the further electromechanical vehicle height adjustment unit 100 according to embodiments. For illustration, the displacement mechanism may be pre-mounted and assembled on the lower control arm 101. The lower control arm 101 with integrated displacement mechanism may be installed as one unit in the vehicle.

The further electromechanical vehicle height adjustment unit 100 enables more versatile height adjustment operations to be performed. The displacement mechanism allows the lower spring pad 106 to be positioned at any position within a continuous range of positions along the first member 107 of the rotary-to-linear motion conversion mechanism. The locking system 104 may automatically stay in its second configuration in which it prevents displacement of the lower spring pad 106 for any of these positions. This simplifies the construction as compared to height adjustment units that use dedicated geometrical features to define a limited number of predefined height positions. The displacement mechanism of the further electromechanical vehicle height adjustment unit 100 allows the lower spring pad 106 to be positioned at four or more than four different positions along the first member 107.

Enhanced safety is provided by a locking system 104 that is selectively activated to allow displacement of the lower spring pad 106, while automatically performing locking when it is not powered.

Energy Recuperation

The electromechanical vehicle height adjustment unit 200 and/or the further electromechanical vehicle height adjustment unit 100 may respectively be operative to perform energy recuperation.

Figure 14:
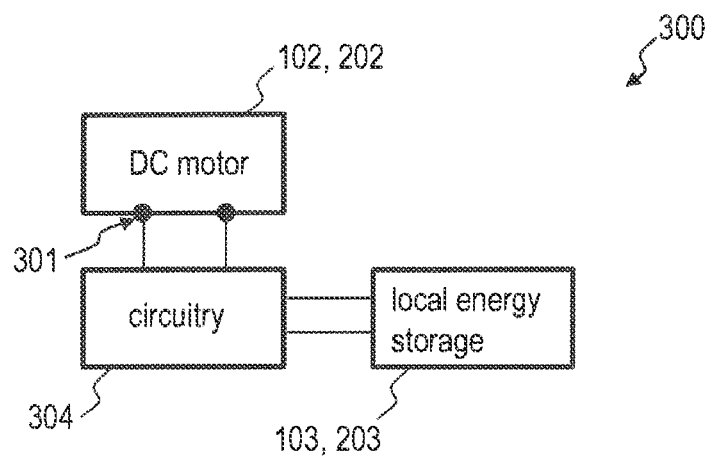
FIG. 14 is a schematic block diagram of a vehicle height adjustment unit according to an embodiment.

FIG. 14 is a block diagram 300 illustrating operation of the electromechanical vehicle height adjustment unit 200 and/or the further electromechanical vehicle height adjustment unit 100. The energy recuperation may use a secondary power pack 103, 203 that may be provided locally for storing energy output by the displacement mechanism in a lowering operation, in which the electric motor 102, 202 acts as a generator (or a separate generator is used). Alternatively or additionally, energy output by the electric motor 102, 202 at its terminals 301 during a lowering operation may be stored in the primary power unit 117, 221 of the vehicle.

The electromechanical vehicle height adjustment unit 200 and/or the further electromechanical vehicle height adjustment unit 100 may comprise circuitry 304. The circuitry 304 may include conductors, logic circuits (such as control units 30, 118, or 222), operative to determine whether charging or discharging is to be performed, and optional converters. The logic circuits 30, 118, 222 may include integrated semiconductor circuits, such as processors, controllers, or application specific integrated circuits (ASICs). The converters may include DC/DC or AC/DC converters. The circuitry 304 may selectively connect the terminals 301 of the electric motor 102, 202 to the secondary power pack 103, 203 during a lowering operation for storing energy in the secondary power pack 103, 203. The circuitry 304 may selectively connect the secondary power pack 103, 203 to the terminals 301 of the electric motor 102, 202 when the secondary power pack 103, 203 is to supply energy to the electric motor 102, 202.

The circuitry 304 may include one or several switches that allow power output by the electric motor 102, 202 at its terminals 301 during a lowering operation to be supplied selectively to either the secondary power pack 103, 203 or the primary power unit 117, 221 of the vehicle. The logic circuits 30, 118, 222 of the circuitry 304 may determine whether the electric energy is to be stored in the secondary power pack 103, 203 or the primary power unit 117, 221 of the vehicle.

Figure 15:
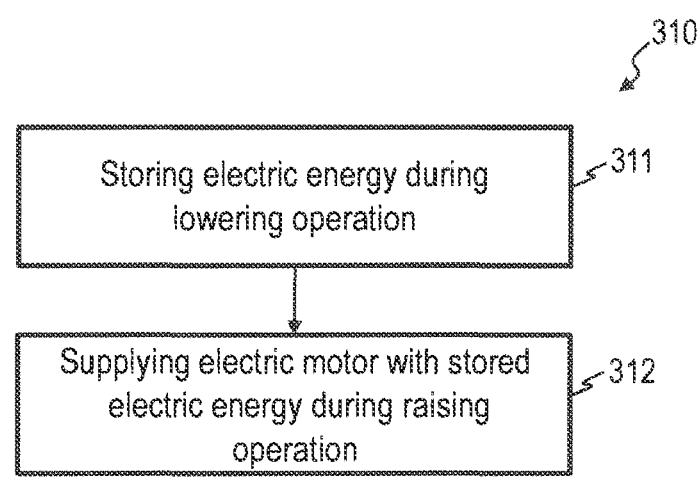
FIG. 15 is a flow chart of a method according to an embodiment.

FIG. 15 is a flow chart of a method 310 that may be performed by the electromechanical vehicle height adjustment unit 200 and/or the further electromechanical vehicle height adjustment unit 100. At step 311, during a lowering operation, the electric motor 102, 202 acts as a generator. Circuitry 304 causes the power output by the electric motor 102, 202 at its terminals 301 to be stored in the secondary power pack 103, 203 or the primary power unit 117, 221 of the vehicle. At step 312, the electric motor 102, 202 and/or other components, such as locking system 104, 204 may be supplied with energy stored in the secondary power pack 103, 203 in a subsequent height adjustment operation.

While a DC motor 102, 202, such as a brushless DC motor, may be particularly suitable for use in energy recuperation, the electromechanical vehicle height adjustment unit 200 and/or the further electromechanical vehicle height adjustment unit 100 may have a motor that outputs an AC voltage at its terminals 300 during a lowering operation. The circuitry 304 may comprise an AC/DC converter interconnected between the terminals 301 of the electric motor 102, 202 and the secondary power pack 103, 203.

Control

The electromechanical vehicle height adjustment unit 200 and/or the further electromechanical vehicle height adjustment unit 100 may respectively be operative to use various input signals to generate a control signal for the electric motor 102, 202 and/or for the locking system 104, 204.

Figure 16:
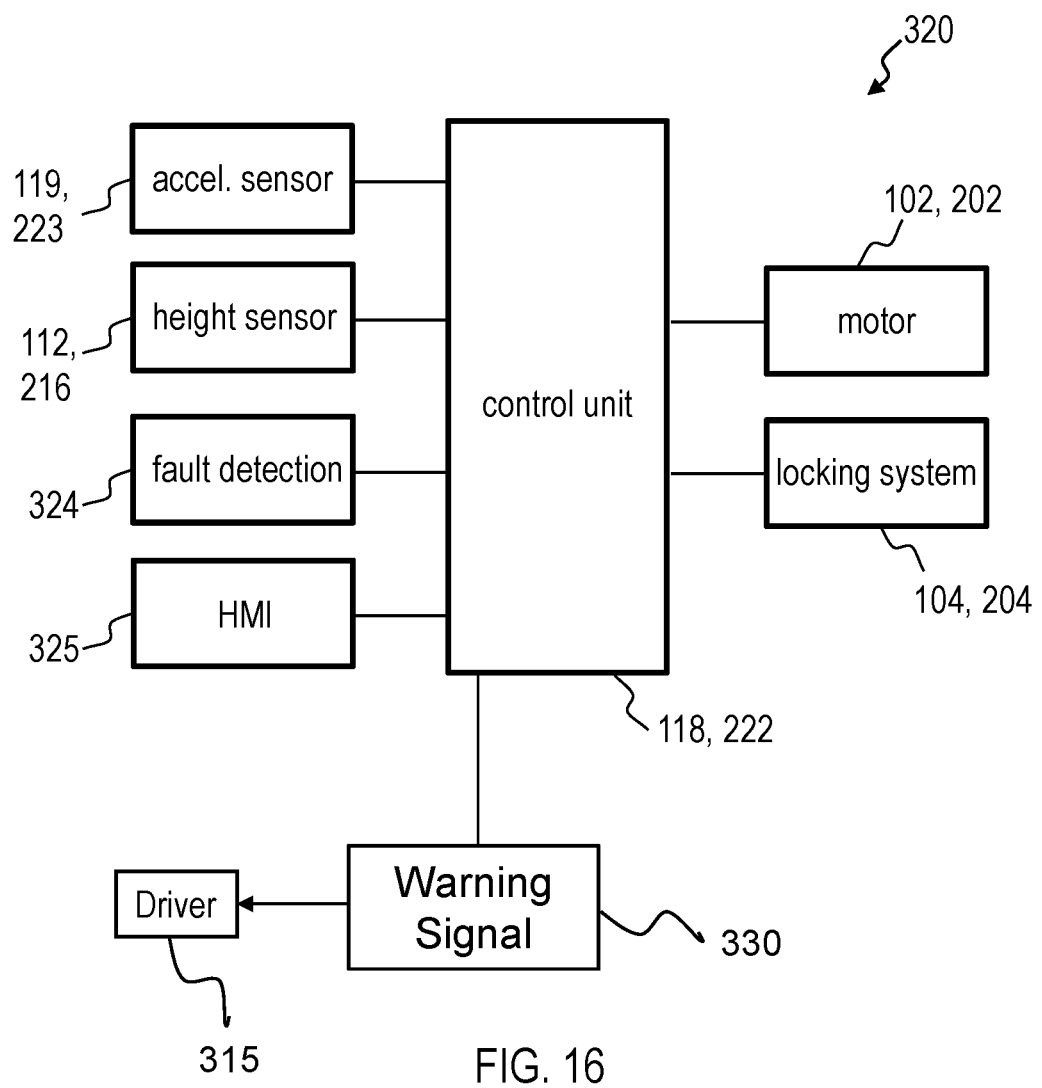
FIG. 16 is a schematic block diagram of a vehicle height adjustment unit according to an embodiment.

FIG. 16 is a schematic block diagram representation 320 illustrating exemplary signals that may be used by the control unit 118, 222 to determine when and for which time period the locking system 104, 204 is to be displaced into its first configuration, in which a raising or lowering operation can be performed. The signals may be used by the control unit 118, 222 to determine when, for which time period, and with which output speed the electric motor 102, 202 is to be actuated.

The control unit 118, 222 may receive an acceleration signal from an acceleration sensor 119, 223. The acceleration signal may be indicative of a vertical acceleration, i.e., an acceleration that may be parallel to gravity or that may be normal to a plane on which the wheels of the vehicle are positioned. The control unit 118, 222 may use the acceleration signal to determine a rate at which a raising operation is to be performed. The control unit 118, 222 may control an output speed of the electric motor 102, 202 in dependence on the acceleration signal.

The control unit 118, 222 may receive a height signal from a height sensor 112, 216. The height signal may be indicative of a level offset that is caused by the loading of the vehicle, such as passenger weight or other on-board weight of the vehicle. The control unit 118, 222 may use the height signal in a control loop, e.g., an open or closed-loop control procedure, to determine to which position along the first member 107 of the rotary-to-linear motion conversion mechanism the second member 108 is to be displaced or to which position the top mount 205 is to be displaced relative to the upper spring pad 209. The control unit 118, 222 may use one or several look-up tables and/or numerical routines to determine the target position of the second member 108 along the first member 107 and/or to determine a target position of the first member 207 relative to the second member 208 of the rotary-to-linear motion conversion mechanism, taking into account any offset that may be required to account for the height offset introduced by passenger weight and other on-board weight of the vehicle, as indicated by the height signal.

The control unit 118, 222 may receive a fault detection signal from a fault detection sensor 324 or several fault detection sensors. The fault detection signal may be indicative of a failure of a malfunction of the electric motor 102, 202, of an interruption in power supply to the electric motor 102, 202 and/or the locking system 104, 204, or of a malfunction of the locking system 104, 204. When there is a malfunction of the electric motor 102, 202 or an interruption of power supply, the locking system 104, 204 will normally still be operative to prevent unintentional height adjustment. When there is a malfunction of the locking system 104, 204, the control unit 118, 222 may, in response to detection of a malfunction of the locking system 104, 204, cause a warning signal 330 to be output to a driver 315 of the vehicle and control the electric motor 102, 202 to set the displacement mechanism to a predefined safe state position. When operation of the locking system 104, 204 is restored, the displacement mechanism may be operated again to drive the lower spring pad 106 or top mount 205 to a position different from the safe state position.

The control unit 118, 222 may receive a signal indicative of a user input at a human machine interface 325. The user input may specify one of several pre-defined height settings. The user input may specify an arbitrary height value within a continuous range of height values.

The control unit 118, 222 may use the signal indicative of the user input to control the electric motor 102, 202 and/or the locking system 104, 204, so as to set the rotary-to-linear motion conversion mechanism in accordance with a target height determined based on the user input.

The control unit 118, 222 may receive a signal indicative of a situation in which passengers enter or exit the vehicle. The control unit 118, 222 may control the electric motor 102, 202 and/or the locking system 104, 204, so as to temporarily adjust the vehicle height for facilitating boarding and/or unboarding of the vehicle.

ASPECTS

The following aspects of the invention are disclosed:
1. An electromechanical vehicle height adjustment unit (200), comprising:

an upper spring pad (209) operative to support an upper end of a vehicle spring (211);
a top mount (205) that is displaceable relative to the upper spring pad (209); and
a displacement mechanism coupled to the upper spring pad (209) and the top mount (205) and operative to displace the top mount (205) relative to the upper spring pad (209) in a height direction, the displacement mechanism comprising:
a rotary-to-linear motion conversion mechanism (207, 208), comprising a first member (207) that is rotatably mounted and a second member (208); and
an electric motor (202) coupled to the rotary-to-linear motion conversion mechanism (207, 208) to drive the first member (207).

2. The electromechanical vehicle height adjustment unit of aspect 1, the first member (207) having a first outer length ($M'_{oP,oL}$) parallel to a center axis of the first member (207) and having a first inner length ($M'_{oP,iL}$) parallel to the center axis of the first member (207), the second member (208) having a second outer length ($M'_{iP,oL}$) parallel to a center axis of the second member (208) and having a second inner length ($M'_{iP,iL}$) parallel to the center axis of the second member (208), wherein the first outer length ($M'_{oP,oL}$) is at least 2.3 times the second outer length ($M'_{iP,oL}$) and/or wherein first inner length ($M'_{oP,iL}$) is at least 2.1 times the second inner length ($M'_{iP,iL}$).

3. The electromechanical vehicle height adjustment unit of aspect 1 or aspect 2, further comprising the vehicle spring (211), wherein the second member (208) of the rotary-to-linear motion conversion mechanism (207, 208) has an inner diameter ($M'_{iP,iD}$) which is greater than or equal to an outer diameter ($VS'_{uoD}$) of an upper end of the vehicle spring (211).

4. The electromechanical vehicle height adjustment unit of any one of the preceding aspects, wherein the upper spring pad (209) is arranged in a cavity of the first member (207) and/or a cavity of the second member (208) of the rotary-to-linear motion conversion mechanism (207, 208).

5. The electromechanical vehicle height adjustment unit of any one of the preceding aspects, wherein the top mount (205) is operative for attachment to a vehicle body.

6. The electromechanical vehicle height adjustment unit of any one of the preceding aspects, further comprising a lower spring pad (215) operative to support a lower end of the vehicle spring (211), optionally wherein the lower spring pad (215) is connected to a boot (206) extending around a damper (210) at a fixed position along a longitudinal axis of the boot (206).

7. The electromechanical vehicle height adjustment unit of any one of the preceding aspects, wherein the displacement mechanism is operative to position the top mount (205) at four different height positions or more than four different height positions relative to the upper spring pad (209), optionally wherein the displacement mechanism is operative to position the top mount (205) at any height position of a continuous range of height positions relative to the upper spring pad (209).

8. The electromechanical vehicle height adjustment unit of any one of the preceding aspects, wherein the displacement mechanism is operative to output electric energy for storing in a rechargeable energy storage device (203) in response to a vehicle lowering operation.

9. The electromechanical vehicle height adjustment unit of aspect 8, wherein the electric motor (202) is a direct current, DC, motor (202) and the displacement mechanism is operative such that displacement of the top mount (205)

during the vehicle lowering operation effects a rotation of a rotor of the electric motor (202) to output the electric energy via terminals of the electric motor (202).

10. The electromechanical vehicle height adjustment unit of aspect 8 or aspect 9, further comprising:
- the rechargeable energy storage device (203), and circuitry operative
- to effect charging of the rechargeable energy storage device (203) with the electric energy output by the displacement mechanism and
- to effect discharging of the rechargeable energy storage device (203) to perform a vehicle raising operation.

11. The electromechanical vehicle height adjustment unit of any one of the preceding aspects, further comprising:
- a locking system (204) displaceable between a first configuration in which the locking system (204) permits displacement of the top mount (205) relative to the upper spring pad (209) and a second configuration in which the locking system (204) prevents displacement of the top mount (205) relative to the upper spring pad (209).

12. The electromechanical vehicle height adjustment unit of aspect 11, wherein the locking system (204) is coaxial with, and/or operative to engage with, a rotor of the electric motor (202), the first member (207) of the rotary-to-linear motion conversion mechanism (207, 208), or a transmission (205).

13. The electromechanical vehicle height adjustment unit of aspect 11 or aspect 12, wherein the locking system (204) is operative to maintain the second configuration without requiring an electric power supply.

14. The electromechanical vehicle height adjustment unit of any one of aspects 11 to 13, wherein the locking system (204) is configured to be displaced into the second configuration when the top mount (205) is positioned at any one of four or more than four different height positions relative to the upper spring pad (209), optionally wherein the locking system (204) is configured to be displaced into the second configuration when the top mount (205) is positioned at any height position of a continuous range of height positions relative to the upper spring pad (209).

15. The electromechanical vehicle height adjustment unit of any one of aspects 11 to 14, further comprising a control unit (222) operative to
- activate the locking system (204) to place the locking system (204) into the second configuration; and
- in response to detection of a malfunction of the locking system (204),
  - cause a warning signal to be output to a driver of the vehicle and
  - cause activation of the electric motor (202) to displace the top mount (205) relative to the upper spring pad (209) to a defined safe state position.

16. The electromechanical vehicle height adjustment unit of any one of the preceding aspects, further comprising a transmission (214) coupled between the electric motor (202) and the first member (207) of the rotary-to-linear motion conversion mechanism (207, 208), optionally wherein the transmission (205) comprises a belt drive (219), a gear or a gear train (207, 208).

17. The electromechanical vehicle height adjustment unit of any one of the preceding aspects, wherein the displacement mechanism is operative to displace the top mount (205) relative to the upper spring pad (209) in response to a height signal from a height sensor (216) and/or to adjust a displacement speed in response to an acceleration signal from an acceleration sensor (223).

18. The electromechanical vehicle height adjustment unit of any one of the preceding aspects, wherein the displacement mechanism is operative to displace the top mount (205) by at least 60 mm relative to the upper spring pad (209).

19. The electromechanical vehicle height adjustment unit of any one of the preceding aspects, wherein the displacement mechanism is operative to displace the top mount (205) between a lowest position and a highest position relative to the upper spring pad (209), wherein a distance between the lowest position and the highest position defines a stroke length ($S'_L$) of the displacement mechanism, and wherein a ratio between a maximum outer diameter ($M'_{oP,oD}$) of the first member (207) of the rotary-to-linear motion conversion mechanism (207, 208) and the stroke length ($S'_L$) is at least 2.

20. The electromechanical vehicle height adjustment unit of any one of the preceding aspects, wherein the first member (207) of the rotary-to-linear motion conversion mechanism (207, 208) is a ball screw nut having an internal thread and the second member (208) of the rotary-to-linear motion conversion mechanism (207, 208) is a ball screw shaft having an external thread, or wherein the first member (207) of the rotary-to-linear motion conversion mechanism (207, 208) is a screw nut having an internal thread and the second member (208) of the rotary-to-linear motion conversion mechanism (207, 208) is a lead screw shaft having an external thread.

21. The electromechanical vehicle height adjustment unit of any one of the preceding aspects, wherein the second member (208) of the rotary-to-linear motion conversion mechanism (207, 208) is a hollow shaft.

22. The electromechanical vehicle height adjustment unit of any one of the preceding aspects, wherein the first member (207) of the rotary-to-linear motion conversion mechanism (207, 208) has a first outer diameter ($M'_{oP,oD}$) and the second member (208) of the rotary-to-linear motion conversion mechanism (207, 208) has a second inner diameter ($M'_{iP,iD}$), wherein the first outer diameter ($M'_{oP,oD}$) is greater than 1.2 times the second inner diameter ($M'_{iP,iD}$).

23. The electromechanical vehicle height adjustment unit of any one of the preceding aspects, wherein a shaft of the electric motor (202) is not coaxial with the first member (207) of the rotary-to-linear motion conversion mechanism (207, 208).

24. The electromechanical vehicle height adjustment unit of any one of the preceding aspects, wherein the electromechanical vehicle height adjustment unit is a front axle height adjustment unit.

25. A vehicle height adjustment system, comprising:
- at least two vehicle height adjustment units of any one of the preceding aspects, and
- at least one integrated semiconductor circuit operative to control the electric motors (202) of the at least two vehicle height adjustment units.

26. The vehicle height adjustment system of aspect 25, further comprising:
- at least two further vehicle height adjustment units (100).

27. The vehicle height adjustment system of aspect 26, wherein each of the at least two further electromechanical vehicle height adjustment units (100) comprises:
- a control arm (101);
- a lower spring pad (106) operative to support a lower end of a further vehicle spring (109); and
- a further displacement mechanism supported on the control arm (101), wherein at least a portion of the further displacement mechanism is integrated into the control arm, the further displacement mechanism being coupled to the lower spring pad (106) and operative to displace the lower spring pad (106) in a height direction relative to the control arm (101), the further displacement mechanism comprising:
- a further rotary-to-linear motion conversion mechanism (107, 108), comprising a first member (107) that is rotatably mounted and a second member (108) that is mounted so as to be displaceable in a translatory manner; and
- a further electric motor (102) coupled to the further rotary-to-linear motion conversion mechanism (107, 108) to drive the first member (107).

28. The vehicle height adjustment system of aspect 27, wherein the first member (107) and/or the second member (108) of the further rotary-to-linear motion conversion mechanism (107, 108) are adapted to project into an interior volume of the further vehicle spring.

29. The vehicle height adjustment system of aspect 27 or aspect 28, wherein the first member (107) and/or the second member (108) of the further rotary-to-linear motion conversion mechanism (107, 108) pass through an inner opening of the lower spring pad (106).

30. The vehicle height adjustment system of any one of aspects 27-29, wherein the further electromechanical vehicle height adjustment unit (100) is a rear axle height adjustment unit (100).

31. The vehicle height adjustment system of any one of aspects 27-30, wherein the control arm (101) is a lower control arm (101).

32. The vehicle height adjustment system of any one of aspects 27-31, wherein the further electric motor (102) is attached to the control arm (101) and the first member (107) of the further rotary-to-linear motion conversion mechanism (107, 108) is rotatably supported in a cavity of the control arm (101).

33. The vehicle height adjustment system of any one of aspects 27-32, wherein the further displacement mechanism is operative to position the lower spring pad (106) at four different height positions or more than four different height positions, optionally wherein the further displacement mechanism is operative to position the lower spring pad (106) at any height position of a continuous range of height positions.

34. The vehicle height adjustment system of any one of aspects 27-33, wherein the further displacement mechanism is operative to output electric energy for storing in a rechargeable energy storage device (103) in response to a vehicle lowering operation.

35. The vehicle height adjustment system of aspect 34, wherein the further electric motor (102) is a direct current, DC, motor and the further displacement mechanism is operative such that displacement of the lower spring pad (106) during the vehicle lowering operation effects a rotation of a rotor of the further electric motor (102) to output the electric energy via terminals (301) of the further electric motor (102).

36. The vehicle height adjustment system of aspect 34 or aspect 35, further comprising:
- the rechargeable energy storage device (103), and circuitry (116, 118, 304) operative
  - to effect charging of the rechargeable energy storage device (103) with the electric energy output by the further displacement mechanism and
  - to effect partial or full discharging of the rechargeable energy storage device (103) to the further electric motor (102) to perform a vehicle raising operation.

37. The vehicle height adjustment system of any one of aspects 27-36, further comprising:
- a further locking system (104) displaceable between a first configuration in which the further locking system (104) permits displacement of the lower spring pad (106) and a second configuration in which the further locking system (104) prevents displacement of the lower spring pad (106).

38. The vehicle height adjustment system of aspect 37, wherein the further locking system (104) is coaxial with, and/or operative to engage with, a rotor of the further electric motor (102), the first member (107) of the further rotary-to-linear motion conversion mechanism (107, 108), or a transmission (105).

39. The vehicle height adjustment system of aspect 37 or aspect 38, wherein the further locking system (104) is operative to maintain the second configuration without requiring an electric power supply.

40. The vehicle height adjustment system of any one of aspects 37 to 39, wherein the further locking system (104) is adapted to maintain the second configuration when the lower spring pad (106) is positioned at any one of four or more than four different height positions, optionally wherein the further locking system (104) is adapted to maintain the second configuration when the lower spring pad (106) is positioned at any height position of a continuous range of height positions.

41. The vehicle height adjustment system of any one of aspects 37 to 40, further comprising a control unit (118) operative to
- activate the further locking system (104) to place the further locking system (104) into the first configuration; and
- in response to detection of a malfunction of the further locking system (104),
  - cause a warning signal to be output to a driver of the vehicle and
  - cause activation of the further electric motor (102) to displace the lower spring pad (106) to a defined safe state position.

42. The vehicle height adjustment system of any one of aspects 27-41, further comprising a transmission (105) coupled between the further electric motor (102) and the first member (107) of the further rotary-to-linear motion conversion mechanism (107, 108), optionally wherein the transmission (105) comprises a belt drive (115), a gear or a gear train (113, 114).

43. The vehicle height adjustment system of any one of aspects 27-42, wherein the further displacement mechanism is operative to displace the lower spring pad (106) in response to a height signal from a height sensor (112) and/or to adjust a displacement speed in response to an acceleration signal from an acceleration sensor (119).

44. The vehicle height adjustment system of any one of aspects 27-43, wherein the further displacement mechanism is operative to displace the lower spring pad (106) by at least 60 mm in a direction of a longitudinal axis of the first member (107) of the further rotary-to-linear motion conversion mechanism (107, 108).

45. The vehicle height adjustment system of any one of aspects 27-44, wherein the further displacement mechanism is operative to displace the lower spring pad (106) between a lowest position and a highest position along the first member (107) of the further rotary-to-linear motion conversion mechanism (107, 108), wherein a distance between the lowest position and the highest position defines a stroke length ($S_L$) of the further displacement mechanism, and wherein a ratio between a maximum outer diameter ($M_{oP, oD}$) of the second member (108) of the further rotary-to-linear motion conversion mechanism (107, 108) and the stroke length ($S_L$) is equal to or greater than 1.5.

46. The vehicle height adjustment system of any one of aspects 27-45, wherein the first member (107) of the further rotary-to-linear motion conversion mechanism (107, 108) is a ball screw shaft having an external thread and the second member (108) of the further rotary-to-linear motion conversion mechanism (107, 108) is a ball screw nut having an internal thread, or wherein the first member (107) of the further rotary-to-linear motion conversion mechanism (107, 108) is a lead screw shaft having an external thread and the second member (108) of the further rotary-to-linear motion conversion mechanism (107, 108) is a screw nut having an internal thread.

47. The vehicle height adjustment system of any one of aspects 27-46, wherein a shaft of the further electric motor (102) is not coaxial with the first member (107) of the further rotary-to-linear motion conversion mechanism (107, 108).

48. A vehicle (10), comprising:
the vehicle height adjustment system of any one of aspects 25-47.

49. The vehicle of aspect 48, wherein the vehicle (10) is a hybrid vehicle or an electric vehicle.

50. A method of performing a vehicle height adjustment operation using an electromechanical vehicle height adjustment unit, wherein the electromechanical vehicle height adjustment unit comprises an upper spring pad (209) operative to support an upper end of a vehicle spring (211), a top mount (205) that is displaceable relative to the upper spring pad (209), and a displacement mechanism coupled to the upper spring pad (209) and the top mount (205) and operative to displace the top mount (205) relative to the upper spring pad (209) in a height direction, the displacement mechanism comprising an electric motor (202) and a rotary-to-linear motion conversion mechanism (207, 208), wherein the rotary-to-linear motion conversion mechanism (207, 208) comprises a first member (207) that is rotatably mounted and a second member (208), the method comprising:
powering the electric motor (202) to drive the first member (207) of the rotary-to-linear motion conversion mechanism (207, 208) to displace the top mount (205) relative to the upper spring pad (209).

51. The method of aspect 50, further comprising:
activating, by a control unit (222), a locking system (204) to place the locking system (204) into a configuration in which the locking system (204) prevents displacement of the top mount (205) relative to the upper spring pad (209); and
in response to detection of a malfunction of the locking system (204),
causing, by the control unit (222), a warning signal to be output to a driver of the vehicle, and
causing, by the control unit (222), activation of the electric motor (202) to displace the top mount (205) relative to the upper spring pad (209) to a defined safe state position.

52. The method of aspect 51 or aspect 52, wherein the electromechanical vehicle height adjustment unit is an electromechanical vehicle height adjustment unit of any one of aspects 1 to 24.

Various effects and advantages are attained by the adjustment units, systems, and methods according to embodiments. For illustration, the electromechanical vehicle height adjustment unit according to an embodiment has a compact construction and can be readily installed in a vehicle. The electromechanical vehicle height adjustment unit does not use pneumatic or hydraulic adjustment mechanisms, which reduces noise. The electromechanical vehicle height adjustment unit allows energy recuperation to be performed, while providing the versatility of offering height adjustment to a large number of possible height levels.

The adjustment units, systems, and methods according to embodiments may be used in hybrid or electric vehicles, without being limited thereto.

The invention claimed is:

1. An electromechanical vehicle height adjustment unit, comprising:
an upper spring pad operative to support an upper end of a vehicle spring;
a top mount that is displaceable relative to the upper spring pad; and
a displacement mechanism coupled to the upper spring pad and the top mount and operative to displace the top mount relative to the upper spring pad in a height direction, the displacement mechanism comprising:
a rotary-to-linear motion conversion mechanism, comprising a first member that is rotatably mounted and a second member, the first member having a first outer length parallel to a center axis of the first member and having a first inner length parallel to the center axis of the first member, the second member having a second outer length parallel to a center axis of the second member and having a second inner length parallel to the center axis of the second member, wherein the first outer length is at least 2.3 times the second outer length or wherein first inner length is at least 2.1 times the second inner length; and
an electric motor coupled to the rotary-to-linear motion conversion mechanism to drive the first member.

2. The electromechanical vehicle height adjustment unit of claim 1, further comprising the vehicle spring, wherein the second member of the rotary-to-linear motion conversion mechanism has an inner diameter which is greater than or equal to an outer diameter of an upper end of the vehicle spring.

3. The electromechanical vehicle height adjustment unit of claim 1, wherein the upper spring pad is arranged in at least one of a cavity of the first member and a cavity of the second member of the rotary-to-linear motion conversion mechanism.

4. The electromechanical vehicle height adjustment unit of claim 1, wherein the top mount is operative for rigid attachment to a vehicle body.

5. The electromechanical vehicle height adjustment unit of claim 1, wherein the displacement mechanism is operative to position the top mount at four different height positions or more than four different height positions relative to the upper spring pad.

6. The electromechanical vehicle height adjustment unit of claim 5, wherein the displacement mechanism is operative to position the top mount at any height position of a continuous range of height positions relative to the upper spring pad.

7. The electromechanical vehicle height adjustment unit of claim 1, wherein the displacement mechanism is operative to output electric energy for storing in a rechargeable energy storage device in response to a vehicle lowering operation.

8. The electromechanical vehicle height adjustment unit of claim 1, further comprising:

a locking system displaceable between a first configuration in which the locking system permits displacement of the top mount relative to the upper spring pad and a second configuration in which the locking system prevents displacement of the top mount relative to the upper spring pad.

9. The electromechanical vehicle height adjustment unit of claim 8, wherein the locking system is operative to maintain the second configuration without requiring an electric power supply.

10. The electromechanical vehicle height adjustment unit of claim 1, wherein the displacement mechanism is operative to at least one of displace the top mount relative to the upper spring pad in response to a height signal from a height sensor and adjust a displacement speed in response to an acceleration signal from an acceleration sensor.

11. The electromechanical vehicle height adjustment unit of claim 1, wherein the displacement mechanism is operative to displace the top mount between a lowest position and a highest position relative to the upper spring pad, wherein a distance between the lowest position and the highest position defines a stroke length of the displacement mechanism, and wherein a ratio between a maximum outer diameter of the first member of the rotary-to-linear motion conversion mechanism and the stroke length is at least 2.

12. The electromechanical vehicle height adjustment unit of claim 1, wherein the electromechanical vehicle height adjustment unit is a front axle height adjustment unit.

13. A vehicle height adjustment system, comprising:
at least two vehicle height adjustment units of claim 1, and
at least one integrated semiconductor circuit operative to control the electric motors of the at least two vehicle height adjustment units.

14. A vehicle, comprising:
the vehicle height adjustment system of claim 13.

15. The electromechanical vehicle height adjustment unit of claim 1, wherein the first outer length is at least 2.3 times the second outer length and wherein first inner length is at least 2.1 times the second inner length.

16. The electromechanical vehicle height adjustment unit of claim 1, wherein the upper spring pad is arranged in a cavity of the first member and a cavity of the second member of the rotary-to-linear motion conversion mechanism.

17. The electromechanical vehicle height adjustment unit of claim 1, wherein the second member is a hollow shaft.

18. The electromechanical vehicle height adjustment unit of claim 1, wherein the displacement mechanism is operative to displace the top mount relative to the upper spring pad in response to a height signal from a height sensor and to adjust a displacement speed in response to an acceleration signal from an acceleration sensor.

19. A method of performing a vehicle height adjustment operation using an electromechanical vehicle height adjustment unit, wherein the electromechanical vehicle height adjustment unit comprises an upper spring pad operative to support an upper end of a vehicle spring, a top mount that is displaceable relative to the upper spring pad, and a displacement mechanism coupled to the upper spring pad and the top mount and operative to displace the top mount relative to the upper spring pad in a height direction, the displacement mechanism comprising an electric motor and a rotary-to-linear motion conversion mechanism, wherein the rotary-to-linear motion conversion mechanism comprises a first member that is rotatably mounted and a second member, the method comprising:
powering the electric motor to drive the first member of the rotary-to-linear motion conversion mechanism to displace the top mount relative to the upper spring pad;
activating, by a control unit, a locking system to place the locking system into a configuration in which the locking system allows displacement of the top mount relative to the upper spring pad; and
in response to detection of a malfunction of the locking system,
causing, by the control unit, activation of the electric motor to displace the top mount relative to the upper spring pad to a defined safe state position.

20. The method of claim 19 further comprising:
in response to detection of a malfunction of the locking system,
causing, by the control unit, a warning signal to be output to a driver of the vehicle.

* * * * *